(12) United States Patent
Mueller et al.

(10) Patent No.: US 12,521,807 B2
(45) Date of Patent: Jan. 13, 2026

(54) SAWING TOOL

(71) Applicant: Robert Bosch GmbH, Stuttgart (DE)

(72) Inventors: Johannes Mueller, Zollikofen (CH); Milan Bozic, Luterbach (CH); Daniel Saegesser, Langenthal (CH)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 17/786,770

(22) PCT Filed: Dec. 14, 2020

(86) PCT No.: PCT/EP2020/085918
§ 371 (c)(1),
(2) Date: Jun. 17, 2022

(87) PCT Pub. No.: WO2021/122423
PCT Pub. Date: Jun. 24, 2021

(65) Prior Publication Data
US 2023/0027859 A1    Jan. 26, 2023

(30) Foreign Application Priority Data
Dec. 20, 2019 (DE) ...................... 10 2019 220 365.5

(51) Int. Cl.
*B23D 61/12* (2006.01)
*B23D 61/00* (2006.01)

(52) U.S. Cl.
CPC ......... *B23D 61/123* (2013.01); *B23D 61/006* (2013.01); *B23D 61/127* (2013.01); *B23D 61/128* (2013.01)

(58) Field of Classification Search
CPC ...... B27B 33/02; B23D 61/12; B23D 61/128; B23D 61/123; B23D 61/122
See application file for complete search history.

(56) References Cited

U.S. PATENT DOCUMENTS 111,970 A * 2/1871 Hul .................... B65D 81/3858
229/122.27
134,882 A  1/1873 Hardenbergh
(Continued)

FOREIGN PATENT DOCUMENTS

CN    103596735 A    2/2014
CN    106238822 A    12/2016
(Continued)

OTHER PUBLICATIONS

Shannon commins, Strregth versus sitffness, Cornell uniersity, 2018 (Year: 2018).*
(Continued)

*Primary Examiner* — Adam J Eiseman
*Assistant Examiner* — Fernando A Ayala
(74) *Attorney, Agent, or Firm* — Maginot, Moore & Beck LLP

(57) ABSTRACT

The disclosure relates to a sawing tool, in particular a saw blade, comprising: at least one connection part, which at least partly forms a connection region for connecting to a tool receptacle of a hand-held power tool; at least one main body, in particular one single-piece main body, which is connected to the connection part; at least one array of saw teeth, in particular one array of set saw teeth, which is arranged on the main body; and at least one functional region, in particular one reduction groove region, which is arranged on the main body and on which the array of saw teeth is at least partly arranged. According to the disclosure, the sawing tool has at least one transition region, which is arranged between the at least one connection region and the at least one functional region and which has increased flexural stiffness, in comparison to the functional region, in a direction orthogonal and/or parallel to a cutting plane of the array of saw teeth.

12 Claims, 19 Drawing Sheets

(56) References Cited

U.S. PATENT DOCUMENTS

| | | | | |
|---|---|---|---|---|
| 1,935,149 A * | 11/1933 | Elvin | ............... | B23D 61/123 452/132 |
| 2,606,577 A | 8/1952 | Derr | | |
| 2,710,501 A * | 6/1955 | Hull | ............... | B23D 65/00 451/364 |
| 3,028,889 A * | 4/1962 | Mccarty | ............... | B23D 61/126 D8/95 |
| 3,033,251 A * | 5/1962 | Atkinson | ............... | B23D 61/128 83/835 |
| 3,111,970 A * | 11/1963 | Priest | ............... | B23D 61/128 30/357 |
| 3,728,792 A * | 4/1973 | Gault | ............... | B26B 7/005 D7/650 |
| 4,027,390 A * | 6/1977 | Kendzior | ............... | B23D 61/12 452/160 |
| 4,083,112 A * | 4/1978 | Palm | ............... | B23D 51/10 30/392 |
| 4,399,611 A * | 8/1983 | Maringer | ............... | B21J 1/00 428/685 |
| 4,665,617 A * | 5/1987 | Maier | ............... | B23D 49/162 30/392 |
| 4,739,557 A * | 4/1988 | Wagner | ............... | B23D 51/10 30/392 |
| 4,794,696 A * | 1/1989 | Apfel | ............... | B27B 17/025 30/387 |
| 4,969,270 A * | 11/1990 | Berghauser | ............... | B23D 49/006 30/392 |
| 5,403,318 A * | 4/1995 | Boehringer | ............... | B27B 19/006 606/178 |
| 5,603,252 A * | 2/1997 | Hayden, Sr. | ............... | B23D 61/021 83/835 |
| 5,765,648 A * | 6/1998 | Sheehan | ............... | A01B 1/00 172/381 |
| 5,960,891 A * | 10/1999 | Sheehan | ............... | A01C 5/02 172/381 |
| 6,113,618 A * | 9/2000 | Nic | ............... | B23D 61/123 D24/146 |
| 8,920,424 B2 * | 12/2014 | Boykin | ............... | B27B 33/02 606/82 |
| 9,475,141 B2 * | 10/2016 | Butzen | ............... | B23D 61/128 |
| 10,239,137 B1 * | 3/2019 | Bates | ............... | B23D 61/121 |
| 2002/0121023 A1 * | 9/2002 | Kocher | ............... | B23D 65/00 30/357 |
| 2002/0184988 A1 * | 12/2002 | Rohman | ............... | B23D 61/123 83/13 |
| 2003/0051593 A1 * | 3/2003 | Kocher | ............... | B23D 61/128 83/835 |
| 2003/0200853 A1 * | 10/2003 | Gongola | ............... | B23D 61/025 83/522.15 |
| 2004/0098000 A1 * | 5/2004 | Kleinwaechter | ...... | B23D 61/123 D24/146 |
| 2006/0137498 A1 * | 6/2006 | Bowling | ............... | B23D 61/126 83/13 |
| 2010/0037472 A1 * | 2/2010 | Lucas | ............... | B27B 17/02 72/362 |
| 2013/0031791 A1 * | 2/2013 | Butzen | ............... | B23D 61/123 30/346 |
| 2013/0269499 A1 * | 10/2013 | Bozic | ............... | B23D 61/006 83/697 |
| 2014/0116224 A1 * | 5/2014 | Kern | ............... | B23D 61/12 83/697 |
| 2015/0000495 A1 * | 1/2015 | Green | ............... | B23D 61/125 83/697 |
| 2016/0375593 A1 * | 12/2016 | Adams | ............... | B26B 9/00 30/350 |
| 2017/0182570 A1 * | 6/2017 | Dvorak | ............... | B27B 19/006 |
| 2019/0184250 A1 * | 6/2019 | Rouzier | ............... | A63B 59/70 |
| 2023/0082586 A1 * | 3/2023 | Lindemann | ............... | A61B 17/142 606/82 |
| 2023/0390840 A1 * | 12/2023 | Brigger | ............... | B23B 51/04 |

FOREIGN PATENT DOCUMENTS

| | | | | |
|---|---|---|---|---|
| DE | 88 05 767 U1 | 7/1988 | | |
| DE | 202 08 553 U1 | 11/2003 | | |
| DE | 102011076630 A1 * | 11/2012 | ............ | B23D 61/006 |
| DE | 20 2012 011 662 U1 | 2/2013 | | |
| DE | 10 2012 204 864 A1 | 6/2013 | | |
| DE | 10 2012 209 253 A1 | 12/2013 | | |
| DE | 10 2013 212 594 A1 | 12/2014 | | |
| EP | 2 216 116 A2 | 8/2010 | | |
| KR | 970006624 Y1 * | 6/1997 | ............ | B27B 19/14 |
| WO | 2007/020462 A1 | 2/2007 | | |
| WO | 2020/099267 A1 | 5/2020 | | |

OTHER PUBLICATIONS

International Search Report corresponding to PCT Application No. PCT/EP2020/085918, mailed Apr. 7, 2021 (German and English language document) (7 pages).

* cited by examiner

SAWING TOOL

This application is a 35 U.S.C. § 371 National Stage Application of PCT/EP2020/085918, filed on Dec. 14, 2020, which claims the benefit of priority to Serial No. DE 10 2019 220 365.5, filed on Dec. 20, 2019 in Germany, the disclosures of which are incorporated herein by reference in their entirety.

BACKGROUND

A sawing tool comprising at least one connecting part which at least partially forms a connecting region for connecting to a tool receptacle of a hand-held power tool, comprising at least one main body which is connected to the connecting part, comprising at least one saw toothing which is arranged on the main body, and comprising at least one functional region which is arranged on the main body and on which the saw toothing is at least partially arranged has already been proposed.

SUMMARY

The disclosure proceeds from a sawing tool, in particular a saw blade, comprising at least one connecting part which at least partially forms a connecting region for connecting to a tool receptacle of a hand-held power tool, comprising at least one main body which is connected to, in particular formed integrally with, the connecting part, comprising at least one, in particular set, saw toothing which is arranged on the main body, and comprising at least one functional region which is arranged on the main body, in particular a reduction groove region on which the saw toothing is at least partially arranged.

It is proposed that the sawing tool has at least one transition region which is arranged between the at least one connecting region and the at least one functional region and which has, compared with the functional region, an increased bending stiffness in a direction orthogonal and/or parallel to a cutting plane of the saw toothing. The configuration according to the disclosure makes it possible to provide a sawing tool which has an advantageously low total weight while simultaneously having an advantageously high bending stiffness. An energy demand for an electric hand-held power tool, in particular for a battery-operated electric hand-held power tool, can be kept advantageously low. The configuration according to the disclosure makes it possible for the electric hand-held power tool to be operated for an advantageously long period with an unchanged battery capacity. An advantageously long battery life can be achieved. Challenges for the sawing tool are in particular differently designed tool receptacles of the hand-held power tool, different application materials, in particular in relation to acting cutting forces and/or torques, a permissible moment of inertia and/or an increase of moments of inertia due to carbide strips of teeth. The sawing tool is preferably configured as a jigsaw blade or as a multifunctional-tool saw blade, in particular as what is known as an OMT saw blade (oscillation multi-tool saw blade). However, in principle, the sawing tool could also be configured as some other saw blade that appears suitable to a person skilled in the art, in particular as a reciprocating saw blade. The sawing tool is preferably provided for use in a jigsaw, in particular a pendulum action jigsaw, or in a multifunctional tool that is driven in an oscillating manner. The term "provided" is intended to mean, in particular, specifically designed and/or specifically equipped. An object being provided for a particular function is intended to mean, in particular, that the object performs and/or carries out this particular function in at least one use state and/or operating state. The main body is preferably fixed to the connecting part by means of a force-fitting, form-fitting and/or materially bonded connection, for example by means of a welded connection, by means of an embossed connection, by means of an adhesive connection or by means of a toothing. The connecting part is preferably in the form of a shank, in particular when the sawing tool is configured as a jigsaw blade, or in the form of a form-fitting connecting part into which a tool receptacle of the hand-held power tool can be at least partially introduced, in particular when the sawing tool is configured as an OMT saw blade. Preferably, the connecting part is at least provided to introduce at least one force and/or at least one torque into the sawing tool. In at least one configuration, in particular when the sawing tool is configured as a jigsaw blade, the connecting part, in particular the shank, is particularly preferably formed integrally with the main body. The term "integrally" is intended to mean, in particular, formed in one piece. Preferably, this one piece is produced from a single blank, a mass and/or a molding. Preferably, the main body has a maximum thickness in particular of at most 2 mm, preferably of at most 1.7 mm, and particularly preferably of at most 1.5 mm. Preferably, the sawing tool has a total weight of in particular at most 10 g, preferably of at most 7 g, preferably of at most 6 g, and particularly preferably of at most 5 g. The saw toothing is preferably formed differently than a serrated edge. The saw toothing is preferably configured as a set saw toothing. However, it is also conceivable for the saw toothing to have some other configuration that appears appropriate to a person skilled in the art and is in particular different than a serrated edge, for example a configuration as a milled and ground saw toothing, as a cross-ground saw toothing, as a riff saw toothing, as a knife saw toothing, as an undulating flat grind with a spacing, in particular independent of a spacing of the reduction grooves, or the like. The saw toothing can be configured in a manner introduced directly into the main body, in particular by milling, grinding or the like, or the saw toothing is configured as a strip of saw teeth which is arranged on the main body by means of a materially bonded connection, for example a welded or soldered connection or the like. It is also conceivable for the saw toothing to have a particle tipping, for example a diamond particle or corundum particle tipping or the like. The saw toothing can be formed from a material that is different than the material of the main body, or the saw toothing is formed from the same material as the main body. The saw toothing can be formed from an HCS (High Carbon Steel), from a bimetal, from a hard metal or a combination of materials. The saw toothing can be arranged on one side or on both sides of the main body. Preferably, a cutting edge of the saw toothing has, in particular when the sawing tool is configured as an OMT saw blade, a maximum extent along the cutting edge which is greater than a maximum extent of the connecting part in a measuring direction parallel to the cutting edge of the saw toothing. In this case, the main body extends along the cutting edge of the saw toothing in a transverse direction to the cutting edge of the saw toothing by at least 10 mm. Preferably, the main body is of weight-optimized configuration in the functional region. Particularly preferably, a maximum cross-sectional area of the main body in the functional region is smaller than a maximum cross-sectional area of the main body in the transition region and/or in the connecting region. The functional region is preferably configured as a reduction groove region. The sawing tool preferably has a multiplicity of reduction grooves which are arranged on the main body, which are introduced into the main body in particular by removal of material and which have a main extent running transversely with respect to the cutting edge of the saw toothing, wherein the reduction grooves extend, in particular starting from the cutting edge in the direction of an end of the main body facing away from the saw toothing, at least over more than 50% of a total transverse extent of at least one flank of the main body. The term "reduction groove" is intended to define in particular a recess or cutout which is arranged in particular in the main body. Preferably, the reduction grooves have been introduced into the main body by removal of material from the main body. However, it is also conceivable for the reduction grooves to have been introduced into the main body by some other method that appears appropriate to a person skilled in the art, for example by embossing or the like. Particularly preferably, the reduction grooves are arranged on both sides of the main body, wherein reduction grooves are arranged on the flank and further reduction grooves of the sawing tool are arranged on a further flank of the main body. Preferably, the reduction grooves on the flank are arranged in an offset manner relative to the further reduction grooves on the further flank. Preferably, the main body is at least partially configured in a wedge-shaped manner in at least one cross-sectional plane. Particularly preferably, the main body at least partially has a clearance angle edge. As a result, the main body can be produced in an advantageously cost-effective manner. Preferably, in the functional region, at an end of the main body facing away from the saw toothing, the main body has a thickness, in particular due to removal of material, which is smaller than the maximum thickness of the main body in the at least one transition region. Preferably, the thickness of the main body, at the end of the main body facing away from the saw toothing, in the functional region is at least substantially constant. Preferably, in the functional region, the main body has an angled flank portion of the flank. Preferably, in the functional region, the main body has an angled further flank portion of the further flank. The angled flank portion of the flank is preferably introduced into the main body by removal of material, in particular by grinding. The angled further flank portion of the further flank is preferably introduced into the main body by removal of material, in particular by grinding. In principle, the functional region can be provided so as to provide a particularly smooth surface of the main body. As a result, friction and thus heat input into the sawing tool can be kept advantageously low. In principle, the functional region can be provided so as to provide a particularly rough surface of the main body. As a result, an areal removal of material on a workpiece, for example in a grinding manner, can be achieved in addition to a sawing function. In principle, the sawing tool may also have at least one aperture which is arranged on the main body and in the functional region and which is in particular in the form of a through-opening, and/or at least one groove which is arranged on the main body. Preferably, the cutting plane is configured as a main extent plane of the main body, in particular in the functional region. A "main extent plane" of a structural unit is intended to mean in particular a plane which is parallel to the greatest side surface of the smallest imaginary cuboid that only just completely encloses the structural unit, and which runs in particular through the center of the cuboid. The transition region is preferably arranged between the connecting region and the functional region. Preferably, the transition region directly adjoins the connecting region. Preferably, the transition region directly adjoins the functional region. Particularly preferably, the transition region and the connecting region are arranged relative to one another in an overlap-free manner. Particularly preferably, the transition region and the functional region are arranged relative to one another in an overlap-free manner. Particularly preferably, the connecting region and the functional region are arranged relative to one another in an overlap-free manner. Particularly preferably, at least one connection point of the sawing tool is arranged in the transition region. Preferably, the main body is connected to the connecting part at the at least one connection point in a force-fitting, form-fitting and/or materially bonded manner. The transition region is preferably formed differently than a machine interface, in particular a shank. The connecting part is preferably configured in a cranked manner when the sawing tool is configured as an OMT saw blade. A different height and/or width of a cranked formation of the connecting part and/or a different connection of the connecting part to the main body advantageously makes it possible to provide an application-adapted sawing tool, in particular for abrasive materials or metals. It is conceivable for a cutting force of in particular 30 N to be applied in the case of abrasive materials, whereas a cutting force of in particular 100 N is applied in the case of metals. In this case, the relatively high cutting force in the case of metals gives rise in particular to a high level of friction, which leads to high torques. Preferably, the sawing tool, in particular the main body and/or the connecting part, has a coating which is in particular at least partially formed from AlTIN (3500±500 HV0.05). For metal applications, the sawing tool is preferably at least partially formed from a hard metal (HM) having a high fracture toughness. Preferably, a tooth spacing for metal applications is at least 1.2 mm. A "tooth spacing" is intended to mean, in particular, a spacing between adjacent teeth of the saw toothing. For abrasive applications, the sawing tool is preferably at least partially formed from a hard metal (HM) having a high hardness. Preferably, a tooth spacing for abrasive applications is at most 1.2 mm.

Furthermore, it is proposed that a maximum thickness of the main body in the at least one transition region corresponds at most to a maximum thickness of the connecting part. This configuration makes it possible to achieve an advantageously low total weight of the sawing tool. As a result of the configuration, an advantageously collision-free movement of the sawing tool relative to the hand-held power tool is made possible. A "thickness" is intended to mean, in particular, a material thickness of the main body, wherein the material thickness corresponds in particular to the smallest edge length of the smallest imaginary cuboid that only just completely encloses the main body. The thickness preferably extends orthogonally with respect to the cutting plane. Preferably, the maximum thickness of the connecting part is at least as great as the maximum thickness of the main body in the transition region. Particularly preferably, the maximum thickness of the main body in the at least one transition region is equal to the maximum thickness of the connecting part.

It is also proposed that the ratio of a maximum longitudinal extent of the transition region to a maximum longitudinal extent of the functional region is less than 1. This configuration makes it possible to achieve an advantageously high bending stiffness of the sawing tool with an advantageously low total weight of the sawing tool. Preferably, the ratio is in particular less than 0.5, preferably less than 0.2, and particularly preferably less than 0.1. Particularly preferably, the ratio is 4 mm/73 mm. Particularly preferably, the maximum longitudinal extent of the transition region is, in particular at least, 4 mm, in particular independently of a maximum longitudinal extent of the sawing tool. Particularly preferably, the maximum longitudinal extent of the functional region is, in particular at most, 73 mm. Preferably, a maximum longitudinal extent between an end of the functional region facing away from the connecting region and an end of the transition region facing toward the connecting region is, in particular at most, 77 mm. Particularly preferably, the sawing tool has a maximum longitudinal extent of 100 mm. Alternatively, the sawing tool may also have some other maximum longitudinal extent that appears suitable to a person skilled in the art, for example 82 mm, 91.5 mm, 100.4 mm, 152 mm, 180 mm or 250 mm. Preferably, the connecting part in the form of a shank is configured as an, in particular simple, T shank. In principle, the connecting part in the form of a shank may also have a shape other than a T shape. Preferably, the connecting part in the form of a shank has a shank length of 22 mm. In principle, the connecting part in the form of a shank may also have some other shank length that appears appropriate to a person skilled in the art.

It is also proposed that the maximum longitudinal extent of the transition region corresponds to at most 50% of a maximum longitudinal extent of a cutting region of the main body, wherein the transition region is at least partially arranged in the cutting region. This configuration makes it possible to achieve an advantageously high bending stiffness of the sawing tool, the sawing tool advantageously being configured in a weight-optimized manner. The maximum longitudinal extent of the transition region corresponds in particular to at most a third, preferably at most 20%, and particularly preferably at most 10%, of the maximum longitudinal extent of the cutting region. Particularly preferably, the maximum longitudinal extent of the transition region corresponds to at least 5% of the maximum longitudinal extent of the cutting region. Preferably, the cutting region is configured over the entire extent of the saw toothing. Preferably, the saw toothing is arranged completely in the cutting region. The saw toothing preferably has a maximum longitudinal extent which corresponds to the maximum longitudinal extent of the cutting region. Particularly preferably, the maximum longitudinal extent of the cutting region corresponds to a sum of the maximum longitudinal extent of the transition region and the maximum longitudinal extent of the functional region.

Furthermore, it is proposed that a maximum longitudinal extent of the transition region is less than 38.5 mm. This configuration makes it possible to provide an advantageously high bending stiffness of the sawing tool in a small region. This configuration makes it possible to keep the total weight of the sawing tool advantageously low. The maximum longitudinal extent of the transition region is in particular at most 20 mm, preferably at most 10 mm, and particularly preferably at most 5 mm. The maximum longitudinal extent of the transition region is in particular at least 15 mm, preferably at least 10 mm, and particularly preferably at least 4 mm.

It is also proposed that, at an end of the main body facing away from the saw toothing, the main body has a thickness, in particular due to removal of material, which corresponds at most to the maximum thickness of the main body in the at least one transition region, wherein the thickness at the end of the main body decreases toward an end of the main body facing away from the connecting region. This configuration makes it possible for the bending stiffness of the sawing tool in the functional region to be increased in an advantageously continuous manner in the direction of the transition region. As a result, the total weight of the sawing tool in the functional region can be kept advantageously low. Preferably, the sawing tool has a lower bending stiffness at the end facing away from the connecting region than at the end of the transition region facing away from the connecting region. Preferably, the bending stiffness runs in an at least substantially linear manner in a direction orthogonal to the cutting plane of the saw toothing between the end facing away from the connecting region and the end of the transition region facing away from the connecting region. The expression "at least substantially" is intended to mean, in particular, that a deviation from a predefined value is in particular less than 25%, preferably less than 10%, and particularly preferably less than 5%, of the predefined value. Preferably, a clearance angle at the flanks of the main body tapers starting from the transition region as far as the end of the main body facing away from the connecting region.

It is also proposed that the sawing tool has at least one elevation which is generated in particular by removal of material on the main body in the at least one functional region and which runs at least substantially parallel to a cutting edge of the saw toothing. This configuration makes it possible to achieve an advantageously high bending stiffness of the sawing tool in the functional region. As a result, the bending stiffness can be increased in a punctiform manner on the main body. Preferably, the at least one elevation has a main extent axis. The main extent axis of the at least one elevation preferably runs at least substantially parallel to the cutting edge of the saw toothing. The at least one elevation is preferably configured as a web. The at least one elevation is in particular provided for increasing the bending stiffness in the direction orthogonal to the cutting plane of the saw toothing. The at least one elevation is preferably arranged within a reduction groove.

Furthermore, it is proposed that, at an end of the at least one transition region facing away from the saw toothing, the at least one transition region has a maximum thickness, in particular due to removal of material, which is smaller than a maximum thickness of the at least one transition region at an end of the at least one transition region facing toward the saw toothing. This configuration makes it possible to keep the total weight of the sawing tool advantageously low. A contour which advantageously protects the material can be provided on the main body, as a result of which a longevity of the sawing tool is achieved. This configuration makes it possible for the sawing tool to slide over at least one guide roller of the hand tool, in particular of the jigsaw, in an advantageously simple and collision-free manner. Preferably, the main body has at least one shoulder and/or at least one bevel at the end of the at least one transition region facing away from the saw toothing. The at least one shoulder and/or the at least one bevel is in particular provided for guiding the sawing tool on the at least one guide roller of the hand tool, in particular of the jigsaw. Particularly preferably, the maximum thickness of the main body in the at least one transition region at the end of the at least one transition region facing away from the saw toothing is preferably at most 1.5 mm, and particularly preferably at most 1.7 mm.

It is also proposed that the main body is formed from an alloy, which comprises at least heat-treatable steel and nickel. This configuration makes it possible to achieve an advantageously high bending stiffness of the sawing tool. This configuration makes it possible to achieve an advantageously high breaking strength of the main body. The main body is preferably heat-treated. As a result, the material properties of the main body with regard to a high bending stiffness can be advantageously influenced. The main body is preferably manufactured from a sheet metal. The sheet metal is preferably in the form of a strip material. A method for producing a sawing tool is also proposed. By means of the configuration according to the disclosure, it is advantageously possible to produce a sawing tool with a low total weight, in particular a sawing tool that is light compared with a sawing tool without reduction grooves. As a result, it is possible to provide a sawing tool which has an advantageously low total weight while simultaneously having an advantageously high bending stiffness. Particularly preferably, a blank of the main body is punched out of a sheet metal in at least one method step. In principle, the blank may be shaped subsequently or at the same time in a shaping process. Preferably, in at least one method step, at least one reduction groove, in particular all the reduction grooves, is/are introduced as a result of a material-removing machining process, for example grinding, milling or the like. Preferably, in at least one method step, the material thickness in the functional region is reduced as a result of a material-removing machining process, for example grinding, milling or the like. Alternatively or in addition, in at least one method step, the main body in the functional region is processed by embossing. Furthermore, in at least one method step, the main body in the functional region is alternatively or additionally processed as a result of a material-applying processing process, in particular additively by means of a 3D printing process, in particular to increase the bending stiffness.

It is not the intention here for the sawing tool according to the disclosure and/or the method according to the disclosure to be limited to the use and embodiment described above. In particular, the sawing tool according to the disclosure and/or the method according to the disclosure may, in order to perform a function described herein, have a number of individual elements, components and units, and method steps, that deviates from a number stated herein. Furthermore, where value ranges are stated in this disclosure, it is also the intention for values lying within the stated boundaries to be disclosed and usable as desired.

BRIEF DESCRIPTION OF THE DRAWINGS

Further advantages will emerge from the following description of the drawing. The drawing illustrates seven exemplary embodiments of the disclosure. The drawing, the description and the disclosure contain numerous features in combination. A person skilled in the art will expediently also consider the features individually and combine them to form meaningful further combinations.

In the drawing.

DETAILED DESCRIPTION

Figure 1:
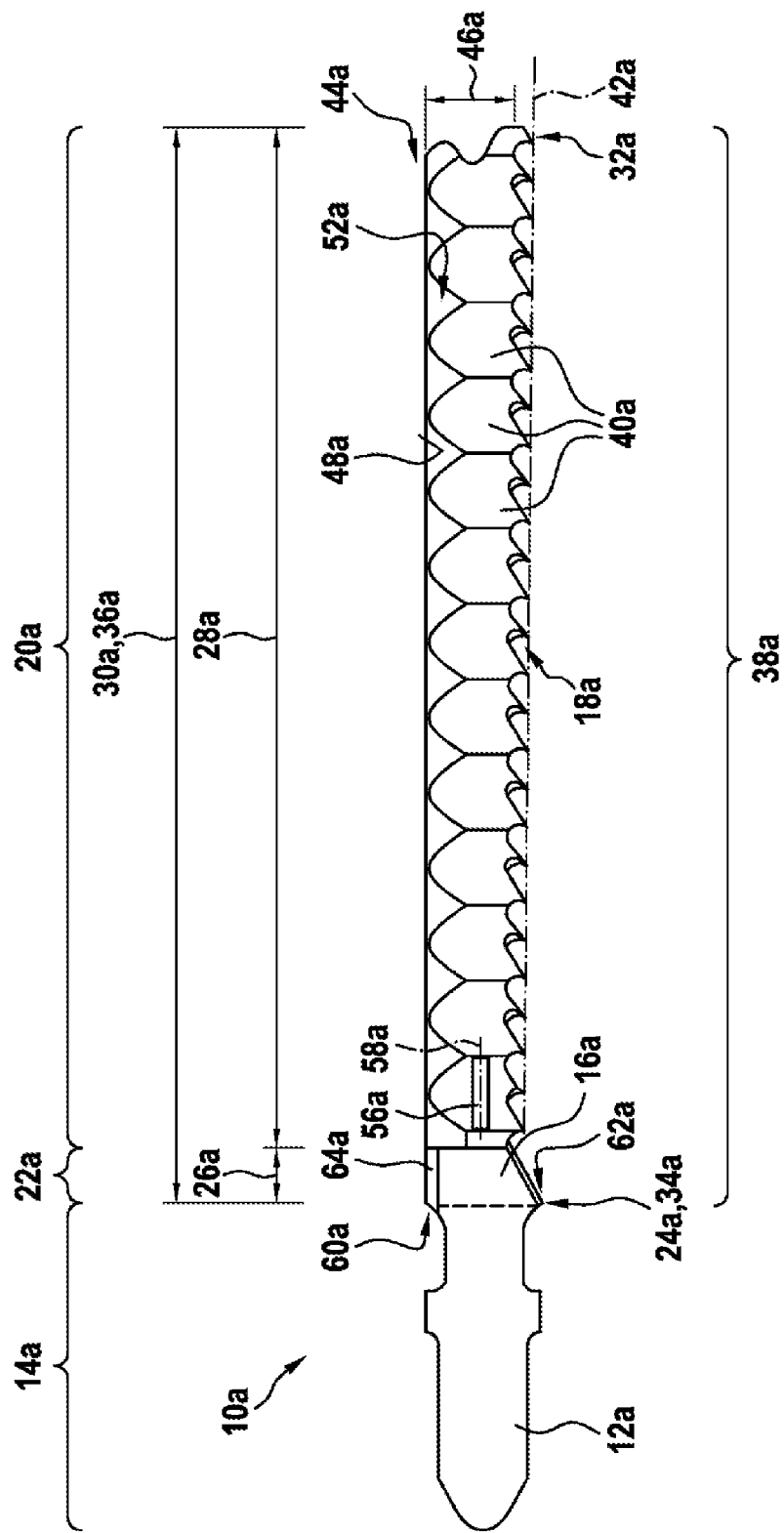
FIG. 1 shows a schematic side view of a sawing tool according to the disclosure in a first exemplary embodiment.

FIG. 1 shows a sawing tool 10a in a first exemplary embodiment. The sawing tool 10a is configured as a saw blade. In the present case, the sawing tool 10a is configured as a jigsaw blade. The sawing tool 10a is provided for use in a jigsaw, in particular a pendulum action jigsaw, that is not illustrated. In the present case, the sawing tool 10a has a total weight of at most 6 g.

The sawing tool 10a has a connecting part 12a which at least partially forms a connecting region 14a for connecting to a tool receptacle of a hand-held power tool, in particular the jigsaw. The connecting part 12a is at least provided to introduce at least one force into the sawing tool 10a.

The sawing tool 10a has a main body 16a which is connected to the connecting part 12a. The main body 16a is of integral form. The main body 16a is formed from an alloy, which comprises at least heat-treatable steel and nickel. The main body 16a is heat-treated. The main body 16a is manufactured from a sheet metal. The sheet metal is in the form of a strip material. In the present case, the main body 16a has a maximum thickness of 1.5 mm. In principle, the main body 16a has a maximum thickness of at most 2 mm. The connecting part 12a is in the form of a shank. The shank is formed integrally with the main body 16a. In the present case, the main body 16a is fixed to the connecting part 12a by means of a materially bonded connection. In the present case, the main body 16a and the connecting part 12a are of integral form.

The sawing tool 10a has a set saw toothing 18a which is arranged on the main body 16a. The saw toothing 18a is formed differently than a serrated edge. The saw toothing 18a is configured as a set saw toothing 18a. However, it is also conceivable for the saw toothing 18a to have some other configuration that appears appropriate to a person skilled in the art and is in particular different than a serrated edge, for example a configuration as a milled and ground saw toothing, as a cross-ground saw toothing, as a riff saw toothing, as a knife saw toothing, as an undulating flat grind with a spacing, or the like. The saw toothing 18a can be configured in a manner introduced directly into the main body 16a, in particular by milling, grinding or the like, or the saw toothing 18a is configured as a strip of saw teeth which is arranged on the main body 16a by means of a materially bonded connection, for example a welded or soldered connection or the like. It is also conceivable for the saw toothing 18a to have a particle tipping, for example a diamond particle or corundum particle tipping or the like. The saw toothing 18a can be formed from a material that is different than the material of the main body 16a. In the present case, the saw toothing 18a is formed from the same material as the main body 16a. The saw toothing 18a is arranged on both sides of the main body 16a.

The sawing tool 10a has a functional region 20a which is arranged on the main body 16a. In the present case, the functional region 20a is configured as a reduction groove region. The saw toothing 18a is at least partially arranged on the functional region 20a. The main body 16a is of weight-optimized configuration in the functional region 20a.

The sawing tool 10a has a transition region 22a. The transition region 22a is arranged on the main body 16a. The saw toothing 18a is partially arranged in the transition region 22a. The transition region 22a is arranged between the connecting region 14a and the functional region 20a. The transition region 22a has, compared with the functional region 20a, an increased bending stiffness in a direction orthogonal to a cutting plane of the saw toothing 18a. The cutting plane is configured as a main extent plane of the main body 16a in the functional region 20a. The transition region 22a is arranged between the connecting region 14a and the functional region 20a. The transition region 22a directly adjoins the connecting region 14a. A maximum thickness of the main body 16a in the transition region 22a corresponds at most to a maximum thickness of the connecting part 12a. The thickness extends orthogonally with respect to the cutting plane. The maximum thickness of the connecting part 12a is at least as great as the maximum thickness of the main body 16a in the transition region 22a. The maximum thickness of the main body 16a in the transition region 22a is equal to the maximum thickness of the connecting part 12a. The transition region 22a and the connecting region 14a are arranged relative to one another in an overlap-free manner. The transition region 22a directly adjoins the functional region 20a. The transition region 22a and the functional region 20a are arranged relative to one another in an overlap-free manner. The connecting region 14a and the functional region 20a are arranged relative to one another in an overlap-free manner. A connection point 24a of the sawing tool 10a is arranged in the transition region 22a. In the present case, the main body 16a is connected to the connecting part 12a at the connection point 24a in a materially bonded manner. The transition region 22a is formed differently than a machine interface, in particular the shank.

The ratio of a maximum longitudinal extent 26a of the transition region 22a to a maximum longitudinal extent 28a of the functional region 20a is less than 1. In the present case, the ratio is less than 0.1. In the present case, the ratio is 4 mm/73 mm. In the present case, the maximum longitudinal extent 26a of the transition region 22a is less than 38.5 mm. In the present case, the maximum longitudinal extent 26a of the transition region 22a is at most 5 mm. In the present case, the maximum longitudinal extent 26a of the transition region 22a is 4 mm. In the present case, the maximum longitudinal extent 28a of the functional region 20a is 73 mm. In the present case, a maximum longitudinal extent 30a between an end 32a of the functional region 20a facing away from the connecting region 14a and an end 34a of the transition region 22a facing toward the connecting region 14a is 77 mm. The maximum longitudinal extent 26a of the transition region 22a corresponds to at most 50% of a maximum longitudinal extent 36a of a cutting region 38a of the main body 16a, wherein the transition region 22a is at least partially arranged in the cutting region 38a. The maximum longitudinal extent 26a of the transition region 22a corresponds to at most 10% of the maximum longitudinal extent 36a of the cutting region 38a. The maximum longitudinal extent 26a of the transition region 22a corresponds to at least 5% of the maximum longitudinal extent 36a of the cutting region 38a. The cutting region 38a is configured over the entire extent of the saw toothing 18a. The saw toothing 18a is arranged completely in the cutting region 38a. The saw toothing 18a has a maximum longitudinal extent which corresponds to the maximum longitudinal extent 36a of the cutting region 38a. The maximum longitudinal extent 36a of the cutting region 38a corresponds to a sum of the maximum longitudinal extent 26a of the transition region 22a and the maximum longitudinal extent 28a of the functional region 20a.

A maximum cross-sectional area of the main body 16a in the functional region 20a is smaller than a maximum cross-sectional area of the main body 16a in the transition region 22a. A maximum cross-sectional area of the main body 16a in the functional region 20a is smaller than a maximum cross-sectional area of the main body 16a in the connecting region 14a. In the present case, the functional region 20a is configured as a reduction groove region. The sawing tool 10a has a multiplicity of reduction grooves 40a which are arranged on the main body 16a. The reduction grooves 40a are introduced into the main body 16a by removal of material. The reduction grooves 40a have a main extent running transversely with respect to a cutting edge 42a of the saw toothing 18a.

The reduction grooves 40a extend, starting from the cutting edge 42a in the direction of an end 44a of the main body 16a facing away from the saw toothing 18a, over more than 50% of a total transverse extent 46a of a flank 48a of the main body 16a. The reduction grooves 40a have been introduced into the main body 16a by removal of material from the main body 16a. However, it is also conceivable for the reduction grooves 40a to have been introduced into the main body 16a by some other method that appears appropriate to a person skilled in the art, for example by embossing or the like. The reduction grooves 40a are arranged on both sides of the main body 16a, wherein reduction grooves 40a are arranged on the flank 48a and further reduction grooves 40a of the sawing tool 10a are arranged on a further flank (not visible) of the main body 16a. The reduction grooves 40a on the flank 48a are arranged in an offset manner relative to the further reduction grooves 40a on the further flank. In the functional region 20a, at the end 44a of the main body 16a facing away from the saw toothing 18a, the main body 16a has a thickness, due to removal of material, which is smaller than the maximum thickness of the main body 16a in the transition region 22a. The thickness of the main body 16a, at the end 44a of the main body 16a facing away from the saw toothing 18a, in the functional region 20a is at least substantially constant. The main body 16a is at least partially configured in a wedge-shaped manner in at least one cross-sectional plane. The main body 16a at least partially has a clearance angle edge. In the functional region 20a, the main body 16a has an angled flank portion 52a of the flank 48a. In the functional region 20a, the main body 16a has an angled further flank portion (not visible) of the further flank. The angled flank portion 52a of the flank 48a is introduced into the main body 16a by removal of material, in particular by grinding. The angled further flank portion of the further flank is introduced into the main body 16a by removal of material, in particular by grinding.

In the present case, the sawing tool 10a has an elevation 56a which is generated by removal of material on the main body 16a in the functional region 20a. The elevation 56a runs at least substantially parallel to the cutting edge 42a of the saw toothing 18a. The elevation 56a has a main extent axis 58a. The main extent axis 58a of the elevation 56a runs at least substantially parallel to the cutting edge 42a of the saw toothing 18a. In the present case, the elevation 56a is configured as a web. The elevation 56a is provided for increasing the bending stiffness in the direction orthogonal to the cutting plane of the saw toothing 18a. The elevation 56a is arranged within a reduction groove 40a. In principle, the sawing tool 10a may have a plurality of elevations 56a which are arranged independently of one another or continuously with one another. In principle, the sawing tool 10a may have a plurality of elevations 56a which are arranged on both sides of the main body 16a.

At an end 60a of the transition region 22a facing away from the saw toothing 18a, the transition region 22a has a maximum thickness, due to removal of material, which is smaller than a maximum thickness of the transition region 22a at an end 62a of the transition region 22a facing toward the saw toothing 18a. In the present case, the main body 16a has a shoulder 64a on both sides at the end 60a of the transition region 22a facing away from the saw toothing 18a. The shoulder 64a is provided for guiding the sawing tool 10a on a guide roller of the hand tool. The maximum thickness of the main body 16a in the transition region 22a at the end 60a of the transition region 22a facing away from the saw toothing 18a is at most 1.7 mm. In the present case, the maximum thickness of the main body 16a in the transition region 22a at the end 60a of the transition region 22a facing away from the saw toothing 18a is 1.4 mm.

Figure 2:
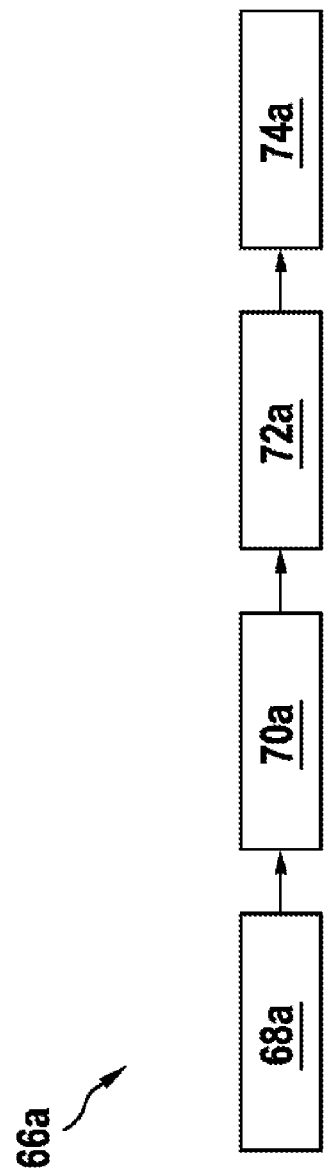
FIG. 2 shows a schematic illustration of a method according to the disclosure in the first exemplary embodiment.

FIG. 2 shows a method 66a for producing the sawing tool 10a in the first exemplary embodiment. In the present case, the method 66a comprises four method steps 68a, 70a, 72a, 74a. In a first method steps 68a, a blank of the main body 16a is punched out of a sheet metal. In a second method step 70a, the reduction grooves 40a are introduced as a result of a material-removing machining process, for example grinding or milling. In the second method step 70a, the elevation 56a is generated by removal of surrounding material of the main body 16a. In a third method step 72a, the material thickness in the functional region 20a is reduced as a result of a material-removing machining process, for example grinding or milling. In a fourth method step 74a, the saw toothing 18a is introduced into the main body 16a. It is fundamentally also possible for the sequence of the method steps 68a, 70a, 72a, 74a to be carried out differently than illustrated here. In principle, the method 66a may also include intermediate method steps and/or further method steps that are not part of the disclosure.

Figure 3:
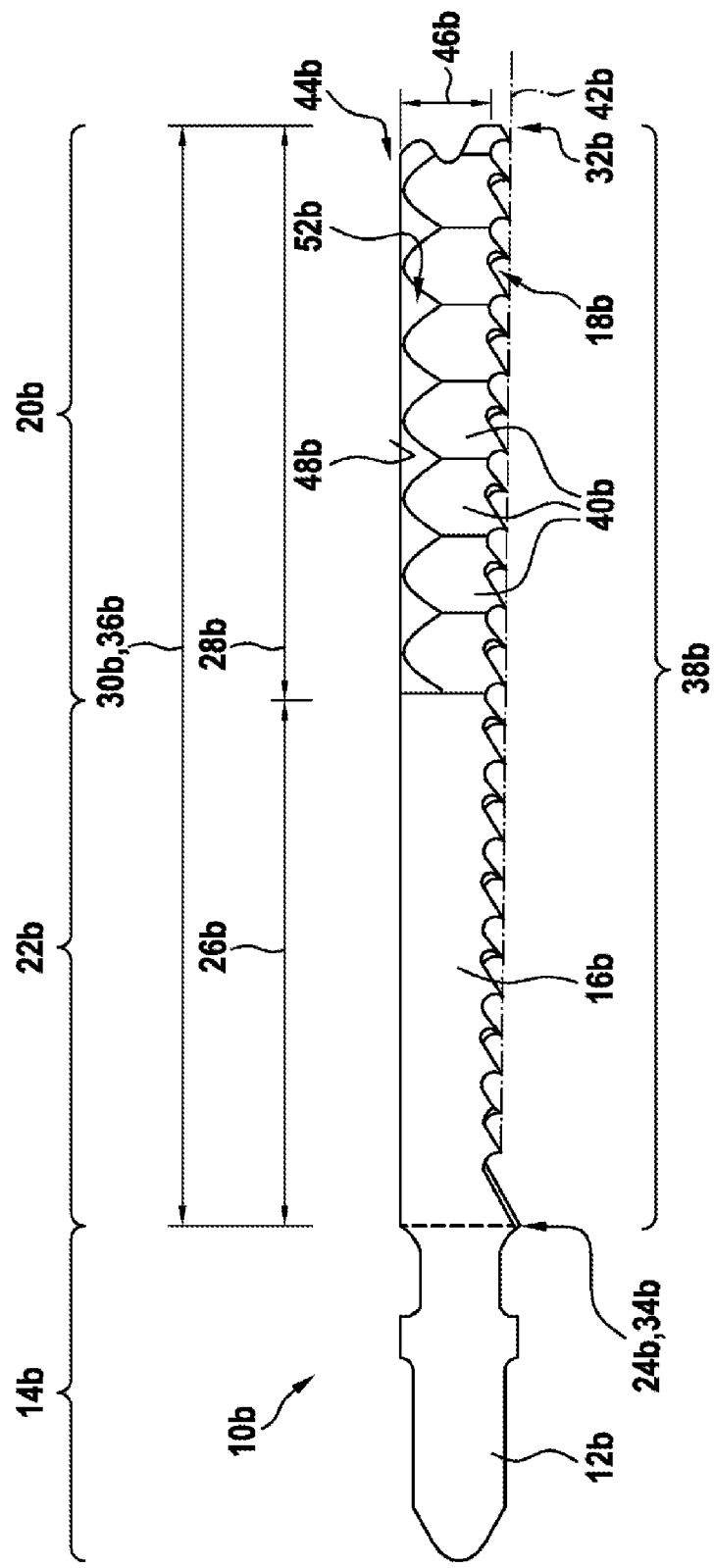
FIG. 3 shows a schematic side view of a sawing tool according to the disclosure in a second exemplary embodiment.
Figure 4:
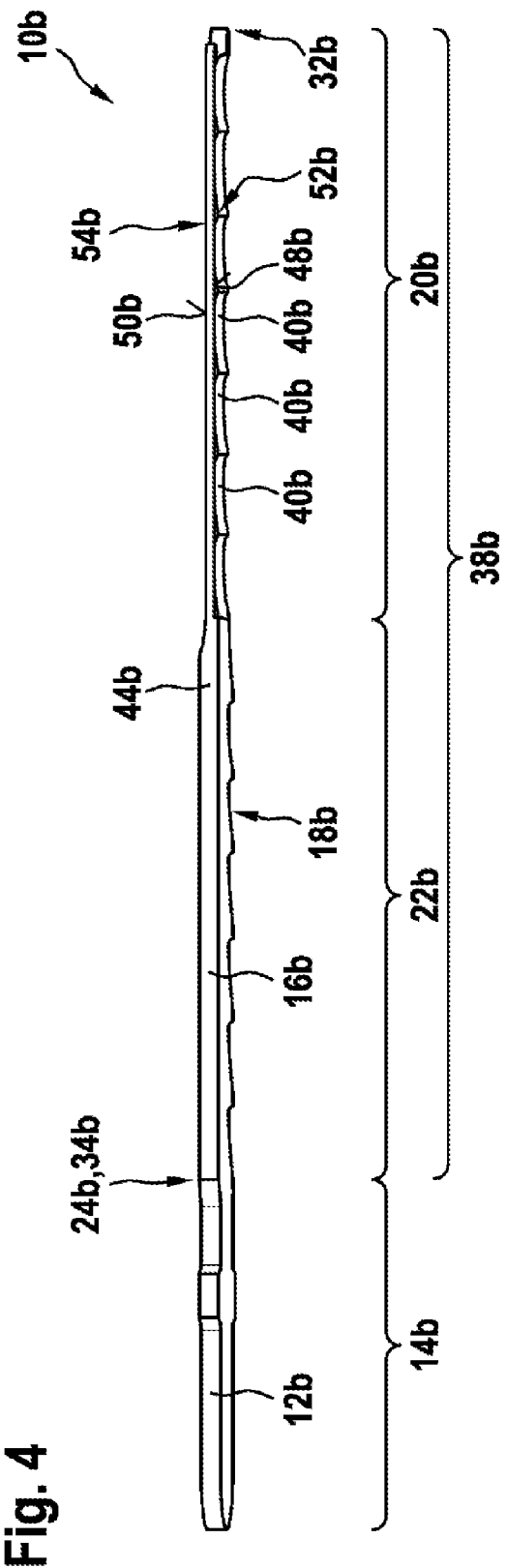
FIG. 4 shows a schematic plan view of the sawing tool according to the disclosure in the second exemplary embodiment.
Figure 5:
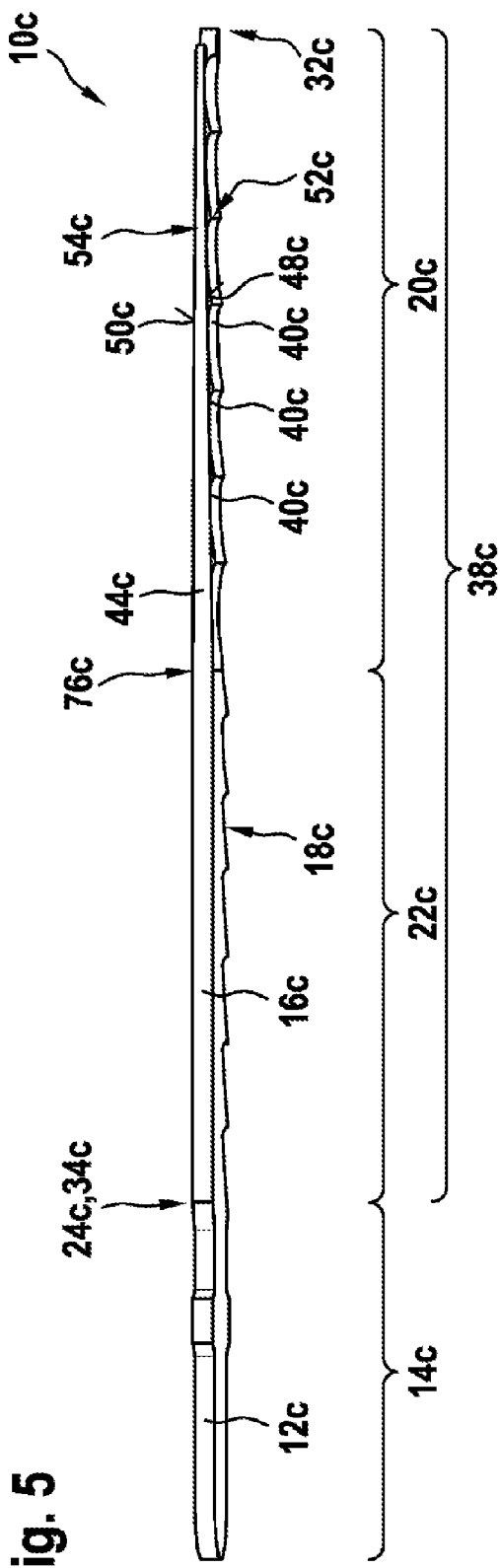
FIG. 5 shows a schematic plan view of a sawing tool according to the disclosure in a third exemplary embodiment.

FIGS. 3 to 5 show two further exemplary embodiments of the disclosure. The following descriptions and the drawings are limited essentially to the differences between the exemplary embodiments, wherein, with regard to identically labeled components, in particular with regard to components with identical reference designations, reference may be made in principle also to the drawings and/or the description of the other exemplary embodiments, in particular FIGS. 1 and 2. In order to distinguish between the exemplary embodiments, the letter a is positioned after the reference designations of the exemplary embodiment in FIGS. 1 and 2. In the exemplary embodiments in FIGS. 3 to 5, the letter a is replaced by the letters b to c.

FIGS. 3 and 4 show a sawing tool 10b in a second exemplary embodiment. The sawing tool 10b is configured as a saw blade. In the present case, the sawing tool 10b is configured as a jigsaw blade. In the present case, the sawing tool 10b has a total weight of at most 7 g. The sawing tool 10a has a connecting part 12b which at least partially forms a connecting region 14b for connecting to a tool receptacle of a hand-held power tool, in particular a jigsaw. The sawing tool 10b has a main body 16b which is connected to the connecting part 12b. The main body 16b is of integral form. The main body 16b is formed from an alloy, which comprises at least heat-treatable steel and nickel. The main body 16b has a maximum thickness of 1.5 mm. In the present case, the main body 16b and the connecting part 12b are of integral form. The sawing tool 10b has a set saw toothing 18b which is arranged on the main body 16b. The sawing tool 10b has a functional region 20b which is arranged on the main body 16b. In the present case, the functional region 20b is configured as a reduction groove region. The saw toothing 18b is at least partially arranged on the functional region 20b. The main body 16b is of weight-optimized configuration in the functional region 20b. The sawing tool 10b has a transition region 22b. The transition region 22b is arranged on the main body 16b.

The transition region 22b is arranged between the connecting region 14b and the functional region 20b. The transition region 22b has, compared with the functional region 20b, an increased bending stiffness in a direction orthogonal to a cutting plane of the saw toothing 18b. A connection point 24b of the sawing tool 10b is arranged in the transition region 22b. The ratio of a maximum longitudinal extent 26b of the transition region 22b to a maximum longitudinal extent 28b of the functional region 20b is less than 1. In the present case, the maximum longitudinal extent 26b of the transition region 22b is less than 38.5 mm. In the present case, a maximum longitudinal extent 30b between an end 32b of the functional region 20b facing away from the connecting region 14b and an end 34b of the transition region 22b facing toward the connecting region 14b is 77 mm. The maximum longitudinal extent 26b of the transition region 22b corresponds to at most 50% of a maximum longitudinal extent 36b of a cutting region 38b of the main body 16b, wherein the transition region 22b is at least partially arranged in the cutting region 38b. In the present case, the maximum longitudinal extent 26b of the transition region 22b corresponds to at least 40% of the maximum longitudinal extent 36b of the cutting region 38b. A maximum cross-sectional area of the main body 16b in the functional region 20b is smaller than a maximum cross-sectional area of the main body 16b in the transition region 22b. In the present case, the functional region 20b is configured as a reduction groove region. The sawing tool 10b has a multiplicity of reduction grooves 40b which are arranged on the main body 16b. The reduction grooves 40b are introduced into the main body 16b by removal of material. The reduction grooves 40b have a main extent running transversely with respect to a cutting edge 42b of the saw toothing 18b. The reduction grooves 40b extend, starting from the cutting edge 42b in the direction of an end 44b of the main body 16b facing away from the saw toothing 18b, over more than 50% of a total transverse extent 46b of a flank 48b of the main body 16b. The reduction grooves 40b are arranged on both sides of the main body 16b, wherein reduction grooves 40b are arranged on the flank 48b and further reduction grooves 40b of the sawing tool 10b are arranged on a further flank 50b of the main body 16b. In the functional region 20b, at the end 44b of the main body 16b facing away from the saw toothing 18b, the main body 16b has a thickness, due to removal of material, which is smaller than the maximum thickness of the main body 16b in the transition region 22b. The thickness of the main body 16b, at the end 44b of the main body 16b facing away from the saw toothing 18b, in the functional region 20b is at least substantially constant. In the functional region 20b, the main body 16b has an angled flank portion 52b of the flank 48b. In the functional region 20b, the main body 16b has an angled further flank portion 54b of the further flank 50b.

FIG. 5 shows a sawing tool 10c in a third exemplary embodiment. The sawing tool 10c is configured as a saw blade. In the present case, the sawing tool 10c is configured as a jigsaw blade. In the present case, the sawing tool 10c has a total weight of at most 7 g. The sawing tool 10c has a connecting part 12c which at least partially forms a connecting region 14c for connecting to a tool receptacle of a hand-held power tool, in particular a jigsaw. The sawing tool 10c has a main body 16c which is connected to the connecting part 12c. The main body 16c is of integral form. The main body 16c is formed from an alloy, which comprises at least heat-treatable steel and nickel. The main body 16c has a maximum thickness of 1.5 mm. In the present case, the main body 16c and the connecting part 12c are of integral form. The sawing tool 10c has a set saw toothing 18c which is arranged on the main body 16c. The sawing tool 10c has a functional region 20c which is arranged on the main body 16c. In the present case, the functional region 20c is configured as a reduction groove region. The saw toothing 18c is at least partially arranged on the functional region 20c. The main body 16c is of weight-optimized configuration in the functional region 20c. The sawing tool 10c has a transition region 22c. The transition region 22c is arranged on the main body 16c. The transition region 22c is arranged between the connecting region 14c and the functional region 20c. The transition region 22c has, compared with the functional region 20c, an increased bending stiffness in a direction orthogonal to a cutting plane of the saw toothing 18c. A connection point 24c of the sawing tool 10c is arranged in the transition region 22c. The ratio of a maximum longitudinal extent of the transition region 22c to a maximum longitudinal extent of the functional region 20c is less than 1. In the present case, the maximum longitudinal extent of the transition region 22c is less than 38.5 mm. In the present case, a maximum longitudinal extent between an end 32c of the functional region 20c facing away from the connecting region 14c and an end 34c of the transition region 22c facing toward the connecting region 14c is 77 mm. The maximum longitudinal extent of the transition region 22c corresponds to at most 50% of a maximum longitudinal extent 36c of a cutting region 38c of the main body 16c, wherein the transition region 22c is at least partially arranged in the cutting region 38c. In the present case, the maximum longitudinal extent of the transition region 22c corresponds to at least 40% of the maximum longitudinal extent of the cutting region 38c. A maximum cross-sectional area of the main body 16c in the functional region 20c is smaller than a maximum cross-sectional area of the main body 16c in the transition region 22c. In the present case, the functional region 20c is configured as a reduction groove region. The sawing tool 10c has a multiplicity of reduction grooves 40c which are arranged on the main body 16c. The reduction grooves 40c are introduced into the main body 16c by removal of material. The reduction grooves 40c have a main extent running transversely with respect to a cutting edge of the saw toothing 18c. The reduction grooves 40c extend, starting from the cutting edge in the direction of an end 44c of the main body 16c facing away from the saw toothing 18c, over more than 50% of a total transverse extent of a flank 48c of the main body 16c. The reduction grooves 40c are arranged on both sides of the main body 16c, wherein reduction grooves 40c are arranged on the flank 48c and further reduction grooves 40c of the sawing tool 10c are arranged on a further flank 50c of the main body 16c.

At an end 44c of the main body 16c facing away from the saw toothing 18c, the main body 16c has a thickness, due to removal of material, which corresponds at most to the maximum thickness of the main body 16c in the transition region 22c, wherein the thickness at the end 44c of the main body 16c decreases toward an end 32c of the sawing tool 10c facing away from the connecting region 14c. The sawing tool 10c has a lower bending stiffness at the end 32c facing away from the connecting region 14c than at an end 76c of the transition region 22c facing away from the connecting region 14c. The bending stiffness runs in an at least substantially linear manner in a direction orthogonal to the cutting plane of the saw toothing 18c between the end 32c facing away from the connecting region 14c and the end 76c of the transition region 22c facing away from the connecting region 14c. A clearance angle at the flanks 48c, 50c of the main body 16c tapers starting from the transition region 22c as far as the end 32c of the sawing tool 10c facing away from the connecting region 14c. In the functional region 20c, the main body 16c has an angled flank portion 52c of the flank 48c. In the functional region 20c, the main body 16c has an angled further flank portion 54c of the further flank 50c.

Figure 6:
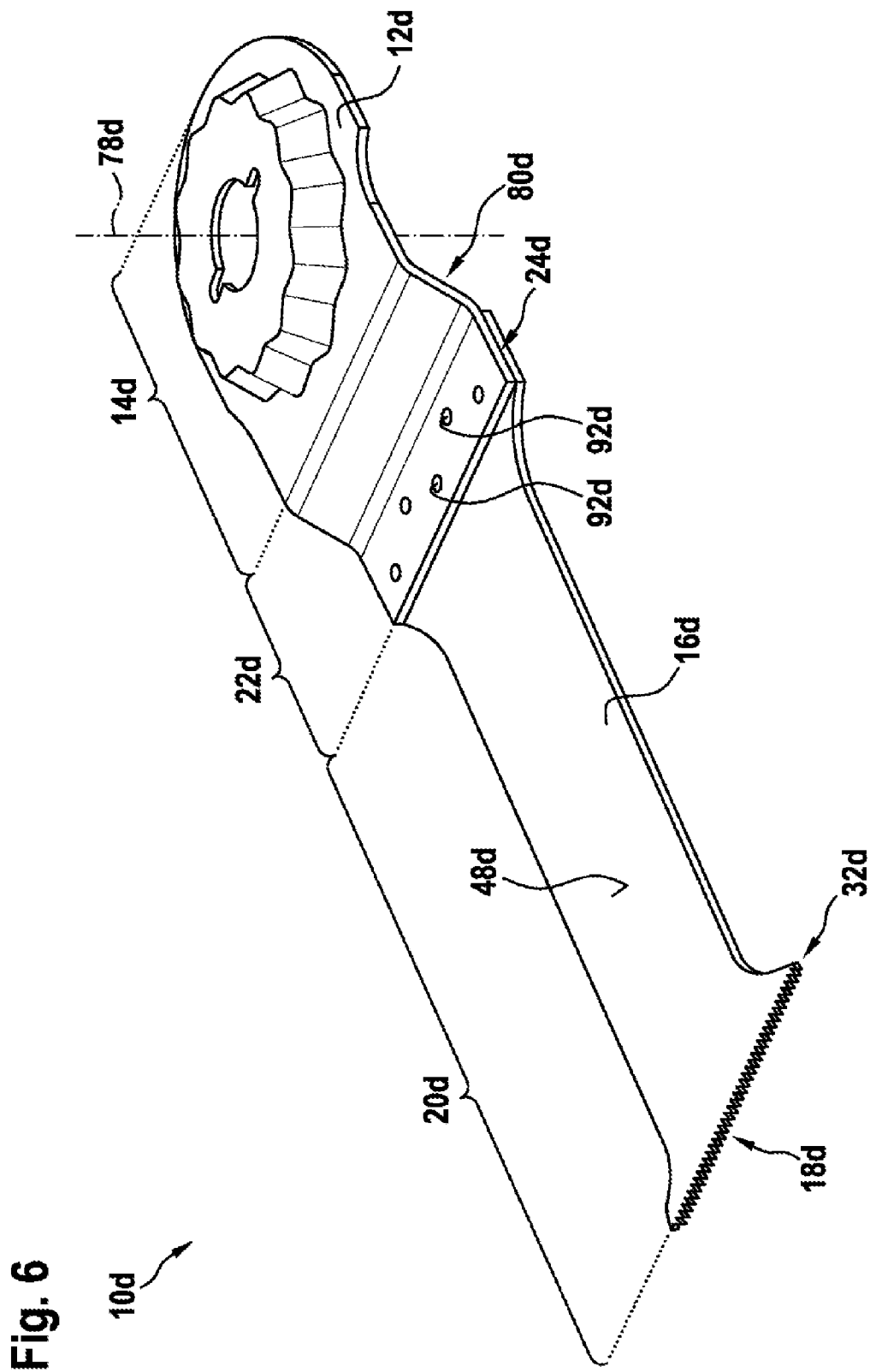
FIG. 6 shows a schematic perspective illustration of a sawing tool according to the disclosure in a fourth exemplary embodiment.

FIG. 6 shows a sawing tool 10d in an alternative, fourth exemplary embodiment. The sawing tool 10d is configured as a saw blade. In the present case, the sawing tool 10d is configured as a multifunctional-tool saw blade, in particular as what is known as an OMT saw blade (oscillation multi-tool saw blade). The sawing tool 10d is provided for use in a multifunctional tool (not illustrated) that is driven in an oscillating manner. The sawing tool 10d has a connecting part 12d which at least partially forms a connecting region 14d for connecting to a tool receptacle of a hand-held power tool, in particular the multifunctional tool that is driven in an oscillating manner. In the present case, the connecting part 12d is configured as a form-fitting connecting part into which a tool receptacle of the hand-held power tool can be at least partially introduced. The connecting part 12d is formed from an alloy, which comprises at least heat-treatable steel and nickel. The sawing tool 10d has a drive axis 78d which is arranged in the connecting region 14d. The connecting part 12d is at least provided to introduce at least one torque into the sawing tool 10d.

The sawing tool 10d has a main body 16d which is connected to the connecting part 12d. In the present case, the main body 16d is of integral form. The main body 16d is formed from an alloy, which comprises at least heat-treatable steel and nickel. The main body 16d is heat-treated. The main body 16d is manufactured from a sheet metal. The sheet metal is in the form of a strip material. In the present case, the main body 16d has a maximum thickness of 2 mm. In the present case, the main body 16d and the connecting part 12d are of integral form. The form-fitting connecting part is formed integrally with the main body 16d. The connecting part 12d is arranged on a flank 48d of the main body 16d. The flank 48d extends orthogonally with respect to the drive axis 78d of the sawing tool 10d. In the present case, the main body 16d is fixed to the connecting part 12d by means of a materially bonded connection. The main body 16d is connected to the connecting part 12d in a materially bonded manner by means of a welded connection, which comprises a plurality of weld points 92d.

The sawing tool 10d has a saw toothing 18d which is arranged on the main body 16d. The sawing tool 10d has a functional region 20d which is arranged on the main body 16d. The thickness of the main body 16d in the functional region 20d is at least substantially constant. The saw toothing 18d is arranged completely in the functional region 20d. The saw toothing 18d is arranged at an end 32d of the sawing tool 10d facing away from the connecting region 14d. In principle, the sawing tool 10d may have at least one reduction groove arranged on the main body 16d in the functional region 20d.

The sawing tool 10d has a transition region 22d. The transition region 22d is partially arranged on the main body 16d. The transition region 22d is partially arranged on the connecting part 12d. The transition region 22d is arranged between the connecting region 14d and the functional region 20d. The transition region 22d has, compared with the functional region 20d, an increased bending stiffness in a direction orthogonal and parallel to a cutting plane of the saw toothing 18d. The cutting plane is configured as a main extent plane of the main body 16d in the functional region 20d. The transition region 22d is arranged between the connecting region 14d and the functional region 20d. The transition region 22d directly adjoins the connecting region 14d. A maximum thickness of the main body 16d in the transition region 22d corresponds at most to a maximum thickness of the connecting part 12d. The thickness extends orthogonally with respect to the cutting plane. The maximum thickness of the connecting part 12d is at least as great as the maximum thickness of the main body 16d in the transition region 22d. The transition region 22d and the connecting region 14d are arranged relative to one another in an overlap-free manner. The transition region 22d directly adjoins the functional region 20d. The transition region 22d and the functional region 20d are arranged relative to one another in an overlap-free manner. The connecting region 14d and the functional region 20d are arranged relative to one another in an overlap-free manner. The main body 16d and the connecting part 12d are arranged so as to partially overlap in the transition region 22d. A connection point 24d of the sawing tool 10d is arranged in the transition region 22d. In the present case, the main body 16d is connected to the connecting part 12d at the connection point 24d in a materially bonded manner.

In the transition region 22d, the main body 16d is connected to the connecting part 12d in an areal manner. The transition region 22d is formed differently than a machine interface, in particular the form-fitting connecting part. A maximum cross-sectional area of the main body 16d in the functional region 20d is smaller than a maximum cross-sectional area of the main body 16a and of the connecting part 12d in the transition region 22d. A cutting edge of the saw toothing 18d has a maximum extent along the cutting edge which is at least 20% greater than a minimum transverse extent of the main body 16d in a measuring direction parallel to the cutting edge of the saw toothing 18d. The cutting edge of the saw toothing 18d is oriented perpendicularly with respect to a longitudinal axis of the sawing tool 10d. The cutting edge of the saw toothing 18d is oriented perpendicularly with respect to the drive axis 78d. The longitudinal axis of the sawing tool 10d is arranged perpendicularly with respect to the drive axis 78d.

The connecting part 12d has a cranked formation 80d. The cranked formation 80d is arranged in the transition region 22d. A main extent plane running centrally in the connecting part 12d is offset by at least 7.8 mm by the cranked formation 80d in the transition region 22d. At the cranked formation 80d, the connecting part 12d has a lower maximum transverse extent, measured parallel to the cutting edge of the saw toothing 18d, than at a point of the connecting part 12d at which the transverse extent is measured orthogonal to the drive axis 78d and parallel to the cutting edge of the saw toothing 18d. In order to achieve different stiffnesses, it is conceivable for a length of the connection between the connecting part 12d and the main body 16d at the connection point 24d to be adapted, wherein the length of the connection is measured parallel to the longitudinal axis of the sawing tool 10d. As a result, it is advantageously possible to provide an application-specific sawing tool 10d. Alternatively or in addition, it is conceivable for an inclination angle of the cranked formation 80d, a material thickness in the transition region 22d and/or a shaping of the connecting part 12d and/or of the main body 16d at the connection point 24d to be adapted, in order to achieve different stiffnesses. In principle, it would additionally or alternatively be possible to achieve different stiffnesses by means of cutouts in a peripheral region of the connection point 24d.

FIGS. 7 to 24 show seventeen further, alternative exemplary embodiments of the disclosure. The following descriptions and the drawings are limited essentially to the differences between the exemplary embodiments, wherein, with regard to identically labeled components, in particular with regard to components with identical reference designations, reference may be made in principle also to the drawings and/or the description of the other exemplary embodiments, in particular FIG. 6. In order to distinguish between the exemplary embodiments, the letter d is positioned after the reference designations of the exemplary embodiment in FIG. 6. In the exemplary embodiments in FIGS. 7 to 24, the letter d is replaced by the letters e to u.

Figure 7:
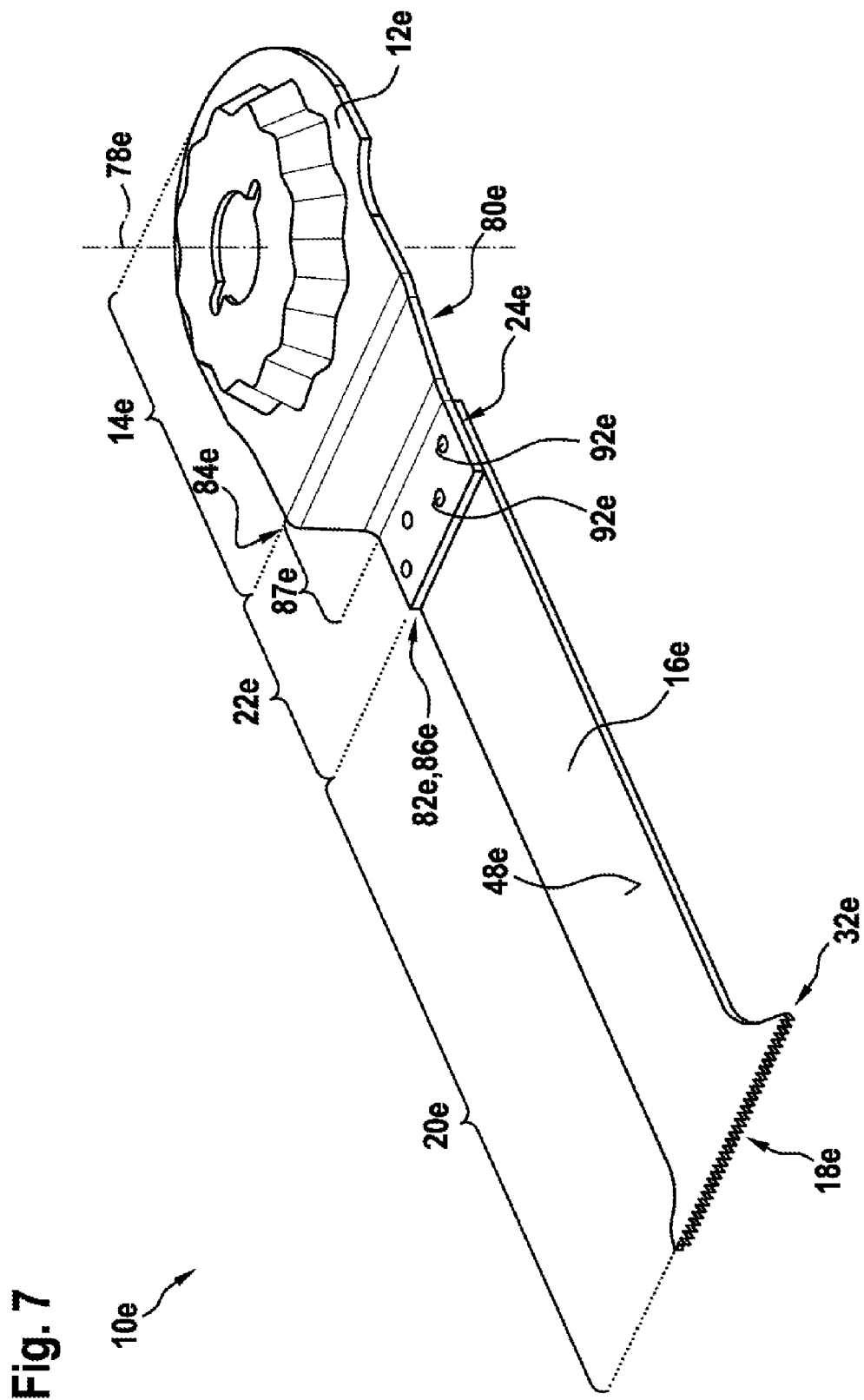
FIG. 7 shows a schematic perspective illustration of a sawing tool according to the disclosure in a fifth exemplary embodiment.

FIG. 7 shows a sawing tool 10e in a fifth exemplary embodiment. The sawing tool 10e is configured as a saw blade. In the present case, the sawing tool 10e is configured as a multifunctional-tool saw blade, in particular as what is known as an OMT saw blade (oscillation multi-tool saw blade). The sawing tool 10e has a connecting part 12e which at least partially forms a connecting region 14e for connecting to a tool receptacle of a hand-held power tool, in particular the multifunctional tool that is driven in an oscillating manner. In the present case, the connecting part 12e is configured as a form-fitting connecting part into which a tool receptacle of the hand-held power tool can be at least partially introduced. The sawing tool 10e has a drive axis 78e which is arranged in the connecting region 14e. The sawing tool 10e has a main body 16e which is connected to the connecting part 12e. In the present case, the main body 16e and the connecting part 12e are of integral form. The connecting part 12e is arranged on a flank 48e of the main body 16e. The sawing tool 10e has a saw toothing 18e which is arranged on the main body 16e. The sawing tool 10e has a functional region 20e which is arranged on the main body 16e. The saw toothing 18e is arranged at an end 32e of the sawing tool 10e facing away from the connecting region 14e. The sawing tool 10e has a transition region 22e. The transition region 22e has, compared with the functional region 20e, an increased bending stiffness in a direction orthogonal and parallel to a cutting plane of the saw toothing 18e. A connection point 24e of the sawing tool 10e is arranged in the transition region 22e. The connecting part 12e has a cranked formation 80e.

At an end 82e of the connecting part 12e facing toward the saw toothing 18e, the connecting part 12e has a maximum cross-sectional area which is smaller than a maximum cross-sectional area at an end 84e of the transition region 22e facing away from the saw toothing 18e. In this case, the cross-sectional area is configured orthogonally with respect to the flank 48e of the main body 16e and parallel to the saw toothing 18e. A maximum cross-sectional area of the connecting part 12e increases in an at least substantially linear manner at least in a region 87e of the cranked formation 80e starting from an end 86e of the transition region 22e facing toward the saw toothing 18e as far as the end 84e of the transition region 22e facing away from the saw toothing 18e.

Figure 8:
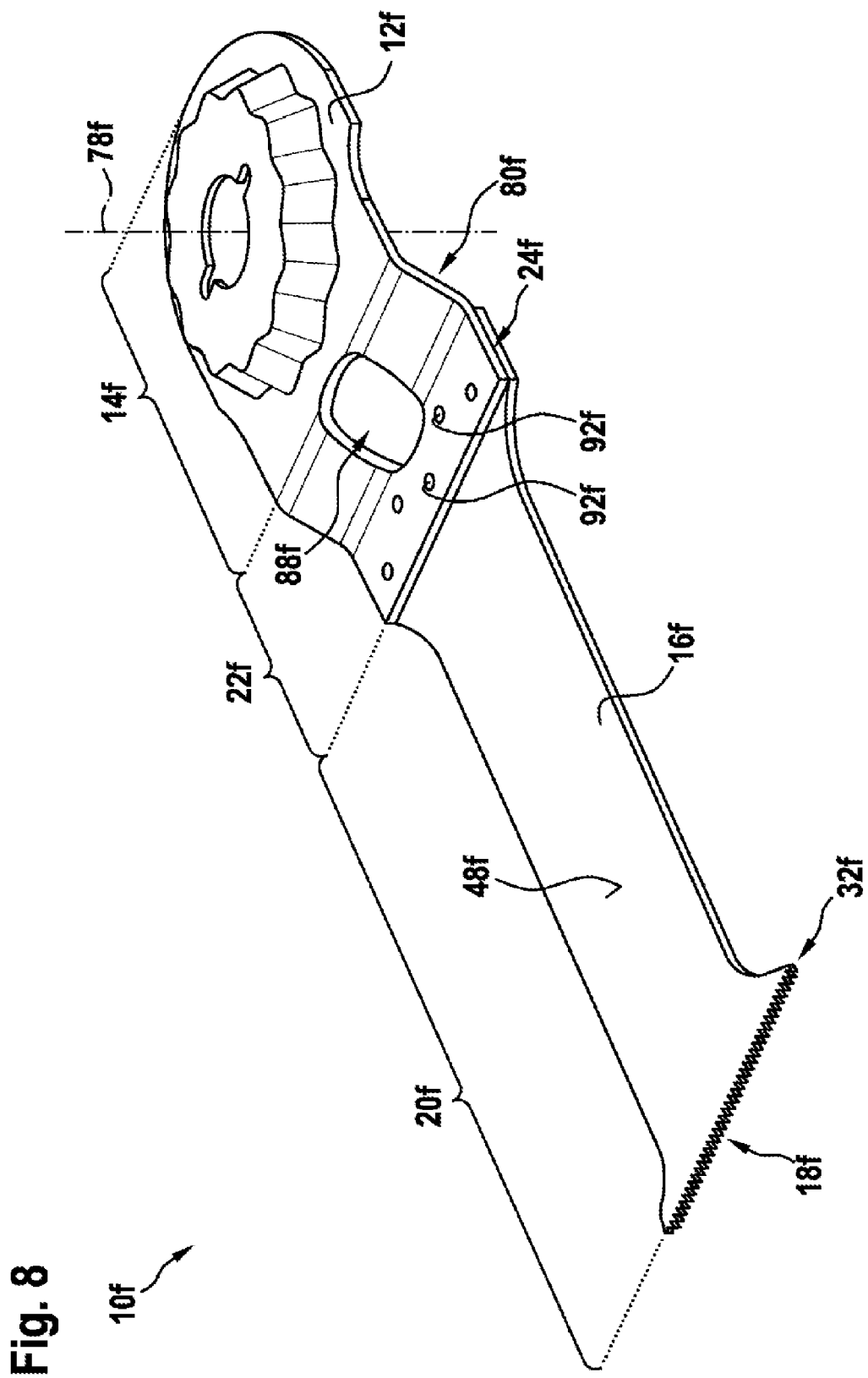
FIG. 8 shows a schematic perspective illustration of a sawing tool according to the disclosure in a sixth exemplary embodiment.

FIG. 8 shows a sawing tool 10f in a sixth exemplary embodiment. The sawing tool 10f is configured as a saw blade. In the present case, the sawing tool 10f is configured as a multifunctional-tool saw blade, in particular as what is known as an OMT saw blade (oscillation multi-tool saw blade). The sawing tool 10f has a connecting part 12f which at least partially forms a connecting region 14f for connecting to a tool receptacle of a hand-held power tool, in particular the multifunctional tool that is driven in an oscillating manner. In the present case, the connecting part 12f is configured as a form-fitting connecting part into which a tool receptacle of the hand-held power tool can be at least partially introduced. The sawing tool 10f has a drive axis 78f which is arranged in the connecting region 14f. The sawing tool 10f has a main body 16f which is connected to the connecting part 12f. In the present case, the main body 16f and the connecting part 12f are of integral form. The main body 16f is connected to the connecting part 12f in a materially bonded manner by means of a welded connection, which comprises a plurality of weld points 92f. The connecting part 12f is arranged on a flank 48f of the main body 16f. The sawing tool 10f has a saw toothing 18f which is arranged on the main body 16f. The sawing tool 10f has a functional region 20f which is arranged on the main body 16f. The saw toothing 18f is arranged at an end 32f of the sawing tool 10f facing away from the connecting region 14f. The sawing tool 10f has a transition region 22f. The transition region 22f has, compared with the functional region 20f, an increased bending stiffness in a direction orthogonal and parallel to a cutting plane of the saw toothing 18f. A connection point 24f of the sawing tool 10f is arranged in the transition region 22f. The connecting part 12f has a cranked formation 80f.

The sawing tool 10f is of weight-optimized configuration. The connecting part 12f is of weight-optimized configuration. The sawing tool 10f has an aperture 88f. The aperture 88f is arranged in the transition region 22f. The aperture 88f is arranged in the cranked formation 80f. As a result, a moment of inertia can be advantageously reduced. The aperture 88f is configured as a through-opening arranged on the connecting part 12f. The aperture 88f is provided to reduce a total weight of the sawing tool 10f. In the transition region 22f, the aperture 88f is arranged centrally on the connecting part 12f. It is fundamentally also possible for the aperture 88f to be configured as a groove. In principle, it would also be conceivable for the sawing tool 10f to have a plurality of apertures in the transition region 22f. The aperture 88f makes it possible to achieve an advantageously high bending stiffness of the sawing tool 10f in a direction parallel to the cutting plane of the saw toothing 18f.

Figure 9:
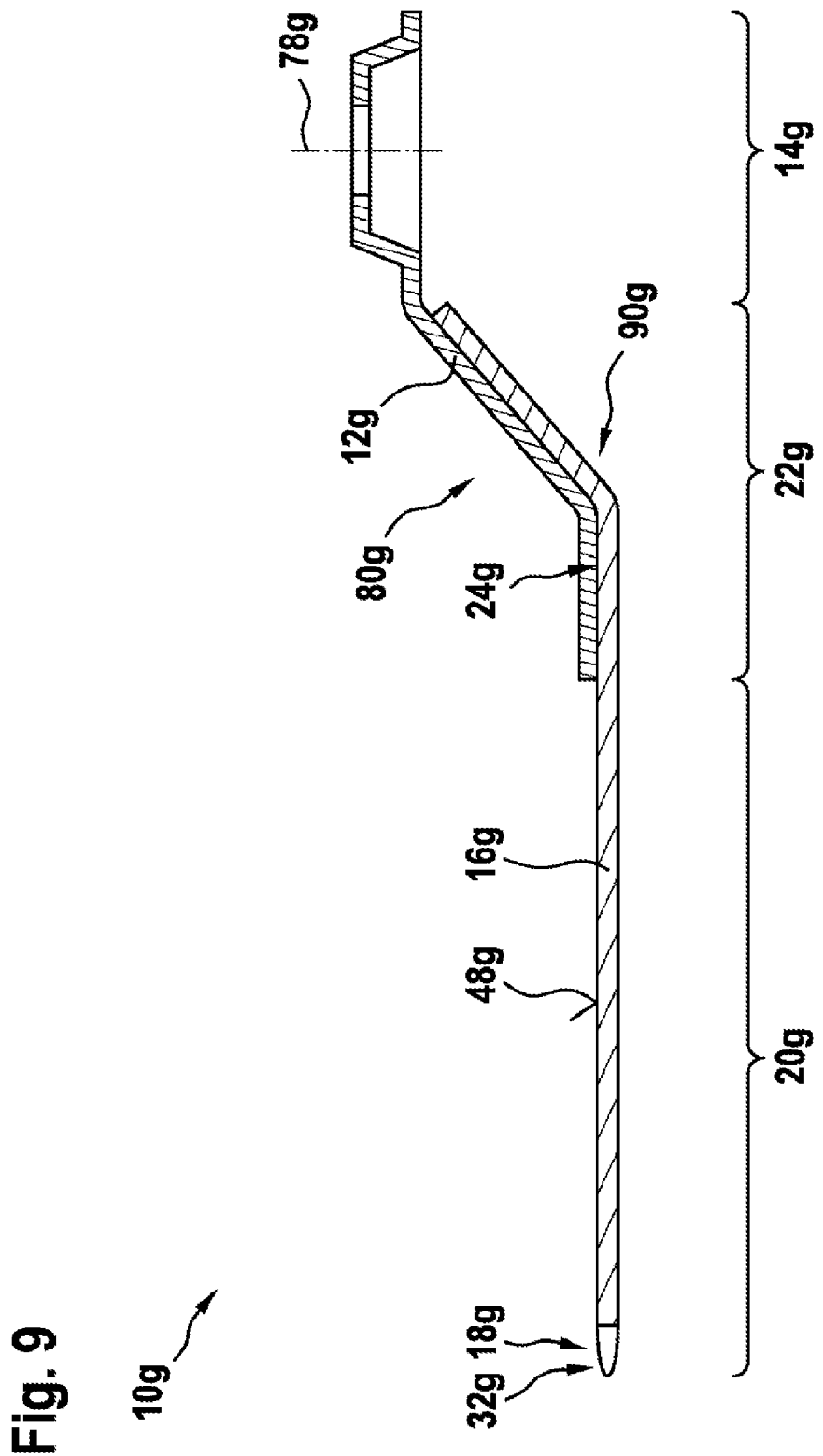
FIG. 9 shows a schematic sectional illustration of a sawing tool according to the disclosure in a seventh exemplary embodiment.

FIG. 9 shows a sawing tool 10g in a seventh exemplary embodiment. The sawing tool 10g is illustrated in section in FIG. 9. The sawing tool 10g is configured as a saw blade. In the present case, the sawing tool 10g is configured as a multifunctional-tool saw blade, in particular as what is known as an OMT saw blade (oscillation multi-tool saw blade). The sawing tool 10g has a connecting part 12g which at least partially forms a connecting region 14g for connecting to a tool receptacle of a hand-held power tool, in particular the multifunctional tool that is driven in an oscillating manner. In the present case, the connecting part 12g is configured as a form-fitting connecting part into which a tool receptacle of the hand-held power tool can be at least partially introduced. The sawing tool 10g has a drive axis 78g which is arranged in the connecting region 14g. The sawing tool 10g has a main body 16g which is connected to the connecting part 12g. In the present case, the main body 16g and the connecting part 12g are of integral form. The connecting part 12g is arranged on a flank 48g of the main body 16g. The sawing tool 10g has a saw toothing 18g which is arranged on the main body 16g. The sawing tool 10g has a functional region 20g which is arranged on the main body 16g. The saw toothing 18g is arranged at an end 32g of the sawing tool 10g facing away from the connecting region 14g. The sawing tool 10g has a transition region 22g. The transition region 22g has, compared with the functional region 20g, an increased bending stiffness in a direction orthogonal and parallel to a cutting plane of the saw toothing 18g. A connection point 24g of the sawing tool 10g is arranged in the transition region 22g. The connecting part 12g has a cranked formation 80g.

The main body 16g has a further cranked formation 90g. The further cranked formation 90g of the main body 16g is arranged in the transition region 22g. The further cranked formation 90g is adapted to the cranked formation 80g of the connecting part 12g. The further cranked formation 90g of the main body 16g is provided to reinforce the cranked formation 80g of the connecting part 12g. As a result, in the transition region 22g, it is possible to achieve an advantageously high bending stiffness of the sawing tool 10g in a direction orthogonal and parallel to the cutting plane of the saw toothing 18f.

Figure 10:
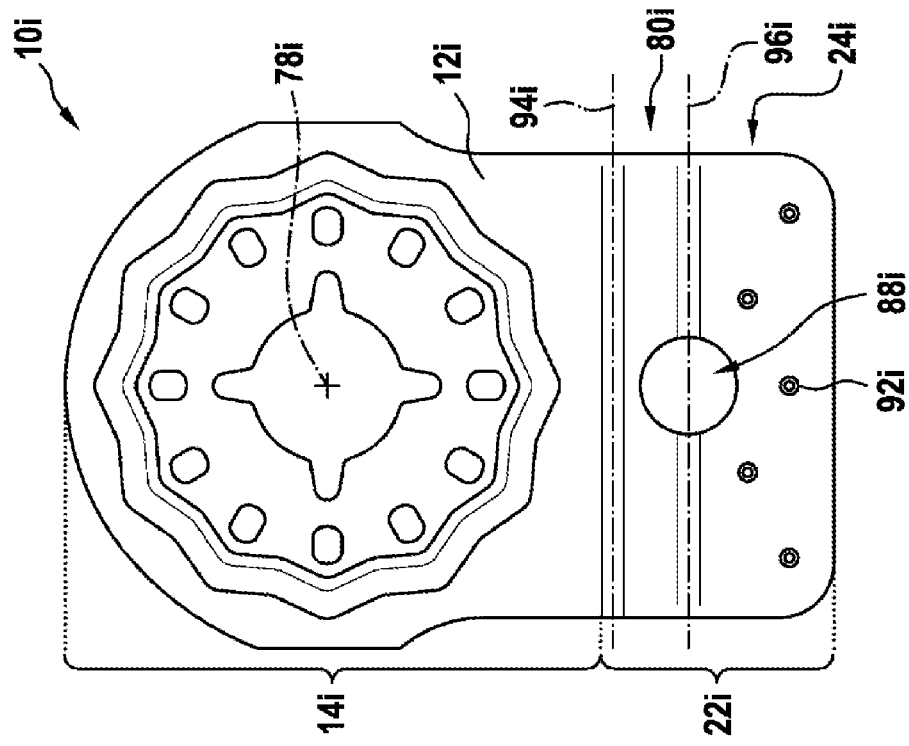
FIG. 10 shows a schematic plan view of a connecting part of a sawing tool according to the disclosure in an eighth exemplary embodiment.

FIG. 10 shows a sawing tool 10h in an eighth exemplary embodiment. The sawing tool 10h is configured in a similar manner to the sawing tool 10f from the sixth exemplary embodiment. The sawing tool 10h has a connecting part 12h which at least partially forms a connecting region 14h for connecting to a tool receptacle of a hand-held power tool, in particular a multifunctional tool that is driven in an oscillating manner. In the present case, the connecting part 12h is configured as a form-fitting connecting part into which a tool receptacle of the hand-held power tool can be at least partially introduced. The sawing tool 10h has a drive axis 78h which is arranged in the connecting region 14h. The sawing tool 10h has a main body which is connected to the connecting part 12h and which is not illustrated in FIG. 10. The main body is configured in a substantially identical manner to the main body 16f from the sixth exemplary embodiment. The main body is connected to the connecting part 12h in a materially bonded manner by means of a welded connection, which comprises a plurality of weld points 92h. The sawing tool 10h has a transition region 22h. The transition region 22h has, compared with a functional region of the main body, an increased bending stiffness in a direction orthogonal and parallel to a cutting plane of a saw toothing. A connection point 24h of the sawing tool 10h is arranged in the transition region 22h. The sawing tool 10h is of weight-optimized configuration. The connecting part 12h is of weight-optimized configuration. The sawing tool 10h has an aperture 88h. The aperture 88h is arranged in the transition region 22h. The aperture 88h is configured as a through-opening arranged on the connecting part 12h. The aperture 88h is provided to reduce a total weight of the sawing tool 10h. In the transition region 22h, the aperture 88h is arranged centrally on the connecting part 12h. The aperture 88h is of circular configuration. The connecting part 12h has a cranked formation 80h. The cranked formation 80h has a first axis of curvature 94h and a second axis of curvature 96h, about which the connecting part 12h is cranked. The second axis of curvature 96h has a greater spacing from the drive axis 78h than the first axis of curvature 94h. The first axis of curvature 94h and the second axis of curvature 96h are oriented parallel to one another. The first axis of curvature 94h is oriented orthogonally with respect to the drive axis 78h. The first axis of curvature 94h is configured at least substantially parallel to a cutting edge of a saw toothing (not illustrated). A center of the aperture 88h is arranged on the first axis of curvature 94h of the cranked formation 80h.

Figure 11:
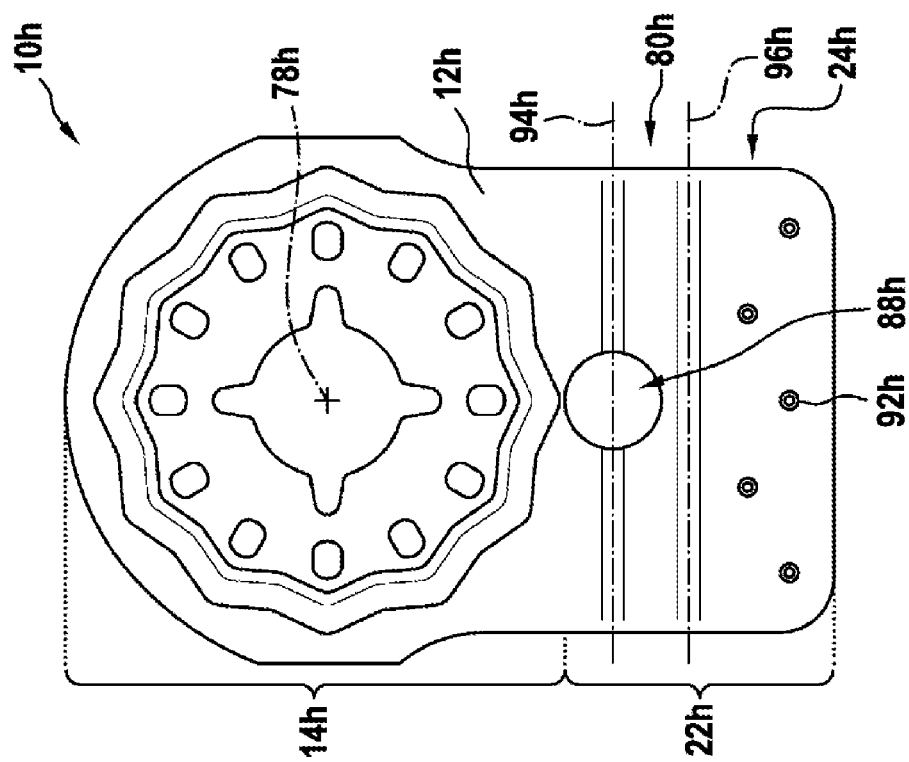
FIG. 11 shows a schematic plan view of a connecting part of a sawing tool according to the disclosure in a ninth exemplary embodiment.

FIG. 11 shows a sawing tool 10i in a ninth exemplary embodiment. The sawing tool 10i has a connecting part 12i which at least partially forms a connecting region 14i for connecting to a tool receptacle of a hand-held power tool, in particular a multifunctional tool that is driven in an oscillating manner. The sawing tool 10i has a drive axis 78i which is arranged in the connecting region 14i. The sawing tool 10i has a transition region 22i. A connection point 24i of the sawing tool 10i is arranged in the transition region 22i. The sawing tool 10i has an aperture 88i. The connecting part 12i has a cranked formation 80i. The cranked formation 80i has a first axis of curvature 94i and a second axis of curvature 96i, about which the connecting part 12i is cranked. In contrast to the eighth exemplary embodiment, a center of the aperture 88i is arranged on the second axis of curvature 94i of the cranked formation 80i.

Figure 12:
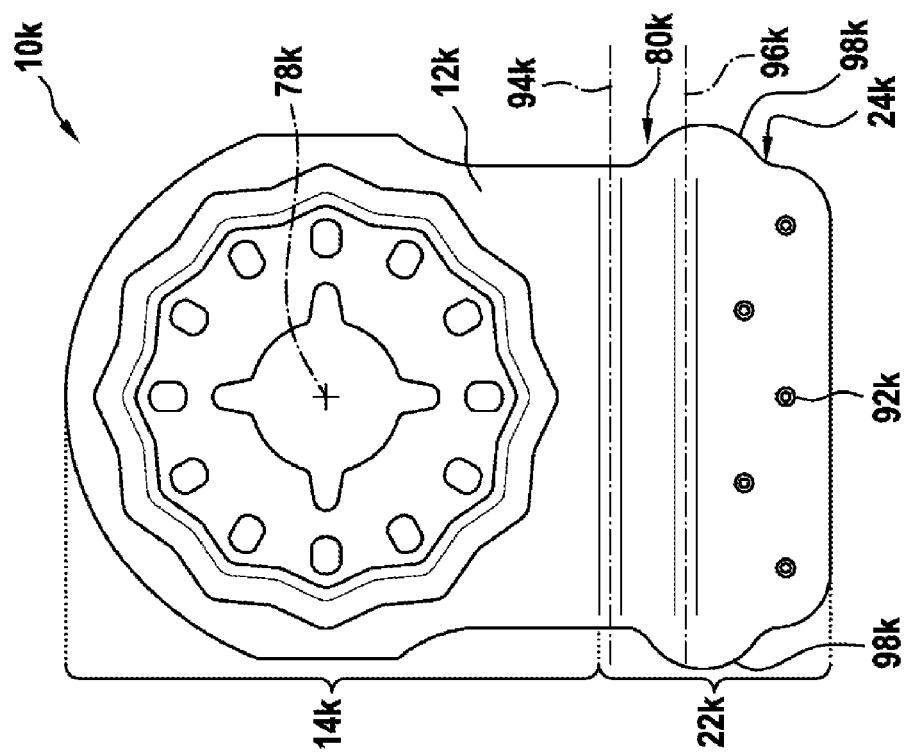
FIG. 12 shows a schematic plan view of a connecting part of a sawing tool according to the disclosure in a tenth exemplary embodiment.

FIG. 12 shows a sawing tool 10j in a tenth exemplary embodiment. The sawing tool 10j is configured in a similar manner to the sawing tool 10d from the fourth exemplary embodiment. The sawing tool 10j has a connecting part 12j which at least partially forms a connecting region 14j for connecting to a tool receptacle of a hand-held power tool, in particular a multifunctional tool that is driven in an oscillating manner. The sawing tool 10j has a drive axis 78j which is arranged in the connecting region 14j. The sawing tool 10j has a main body which is connected to the connecting part 12j and which is not illustrated in FIG. 12. The main body is configured in a substantially identical manner to the main body 16d from the fourth exemplary embodiment. The main body is connected to the connecting part 12j in a materially bonded manner by means of a welded connection, which comprises a plurality of weld points 92j. The sawing tool 10j has a transition region 22j. The transition region 22j has, compared with a functional region of the main body, an increased bending stiffness in a direction orthogonal and parallel to a cutting plane of a saw toothing. A connection point 24j of the sawing tool 10j is arranged in the transition region 22j. The connecting part 12j has a cranked formation 80j. The cranked formation 80j has a first axis of curvature 94j and a second axis of curvature 96j, about which the connecting part 12j is cranked. The second axis of curvature 96j has a greater spacing from the drive axis 78j than the first axis of curvature 94j. In contrast to the eighth and ninth exemplary embodiment in FIGS. 10 and 11, respectively, the sawing tool 10j does not have an aperture. In contrast to the fourth exemplary embodiment in FIG. 6, the connecting part 12j has two projections 98j. The projections 98j are arranged in the transition region 22j. A center of each of the projections 98j is arranged centrally between the first axis of curvature 94j and the second axis of curvature 96j. The first axis of curvature 94j and the second axis of curvature 96j intersect the projections 98j. The projections 98j are cranked by means of the cranked formation 80j. The projections 98j are provided to widen the connecting part 12j in the transition region 22j, in order to in particular increase the bending stiffness. The two projections 98j are arranged on opposite sides of the connecting part 12j. The projections 98j are each arranged laterally on the connecting part 12j. The projections 98j are connected to the connecting part 12j in a materially bonded manner. In at least one view, the projections 98j are each configured in a substantially semicircular manner. The projections 98j have substantially the same material thickness as the connecting part 12j in the transition region 22j.

Figure 13:
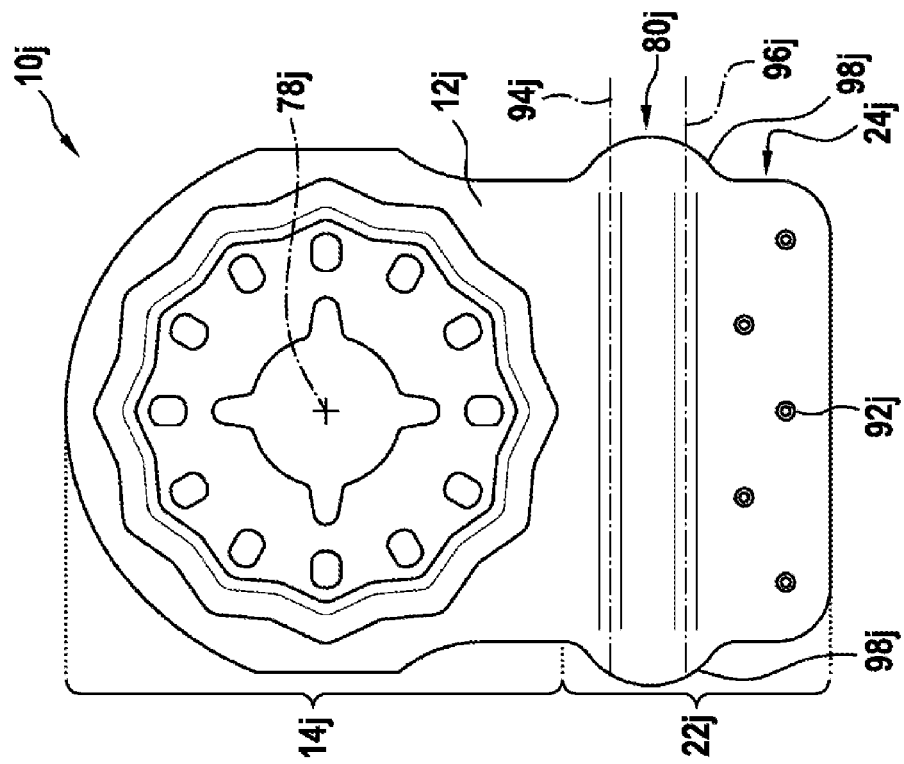
FIG. 13 shows a schematic plan view of a connecting part of a sawing tool according to the disclosure in an eleventh exemplary embodiment.

FIG. 13 shows a sawing tool 10k in an eleventh exemplary embodiment. The sawing tool 10k has a connecting part 12k which at least partially forms a connecting region 14k for connecting to a tool receptacle of a hand-held power tool, in particular a multifunctional tool that is driven in an oscillating manner. The sawing tool 10k has a drive axis 78k which is arranged in the connecting region 14k. The sawing tool 10k has a transition region 22k. A connection point 24k of the sawing tool 10k is arranged in the transition region 22k. The connecting part 12k has a cranked formation 80k. The cranked formation 80k has a first axis of curvature 94k and a second axis of curvature 96k, about which the connecting part 12k is cranked. The connecting part 12k has two projections 98k. In contrast to the tenth exemplary embodiment, a center of the projections 98k is arranged substantially on the second axis of curvature 96k. The first axis of curvature 94k does not intersect the projections 98k. The second axis of curvature 96k intersects the projections 98k. The projections 98k protrude into the connection point 24k.

Figure 14:
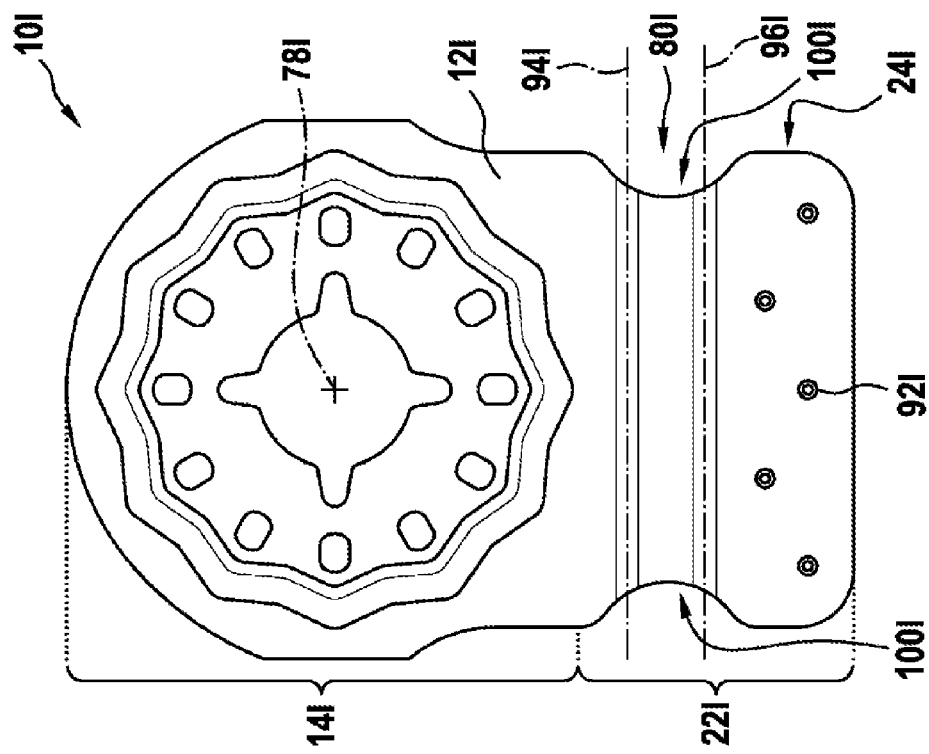
FIG. 14 shows a schematic plan view of a connecting part of a sawing tool according to the disclosure in a twelfth exemplary embodiment.

FIG. 14 shows a sawing tool 10*l* in a twelfth exemplary embodiment. The sawing tool 10*l* is configured in a similar manner to the sawing tool 10*d* from the fourth exemplary embodiment. The sawing tool 10*l* has a connecting part 12*l* which at least partially forms a connecting region 14*l* for connecting to a tool receptacle of a hand-held power tool, in particular a multifunctional tool that is driven in an oscillating manner. The sawing tool 10*l* has a drive axis 78*l* which is arranged in the connecting region 14*l*. The sawing tool 10*l* has a main body which is connected to the connecting part 12*l* and which is not illustrated in FIG. 14. The main body is configured in a substantially identical manner to the main body 16*d* from the fourth exemplary embodiment. The main body is connected to the connecting part 12*l* in a materially bonded manner by means of a welded connection, which comprises a plurality of weld points 92*l*. The sawing tool 10*l* has a transition region 22*l*. The transition region 22*l* has, compared with a functional region of the main body, an increased bending stiffness in a direction orthogonal and parallel to a cutting plane of a saw toothing. A connection point 24*l* of the sawing tool 10*l* is arranged in the transition region 22*l*. The connecting part 12*l* has a cranked formation 80*l*. The cranked formation 80*l* has a first axis of curvature 94*l* and a second axis of curvature 96*l*, about which the connecting part 12*l* is cranked. The second axis of curvature 96*l* has a greater spacing from the drive axis 78*l* than the first axis of curvature 94*l*. In contrast to the fourth exemplary embodiment in FIG. 6, the connecting part 12*l* has two indentations 100*l*. The indentations 100*l* are arranged in the transition region 22*l*. A center of each of the indentations 100*l* is arranged centrally between the first axis of curvature 94*l* and the second axis of curvature 96*l*. The first axis of curvature 94*l* and the second axis of curvature 96*l* intersect the indentations 100*l*. The two indentations 100*l* are arranged on opposite sides of the connecting part 12*l*. The indentations 100*l* are each arranged laterally on the connecting part 12*l*. The indentations 100*l* are configured as cutouts from the connecting part 12*l*. In at least one view, the indentations 100*l* are each configured in a substantially semicircular manner.

Figure 15:
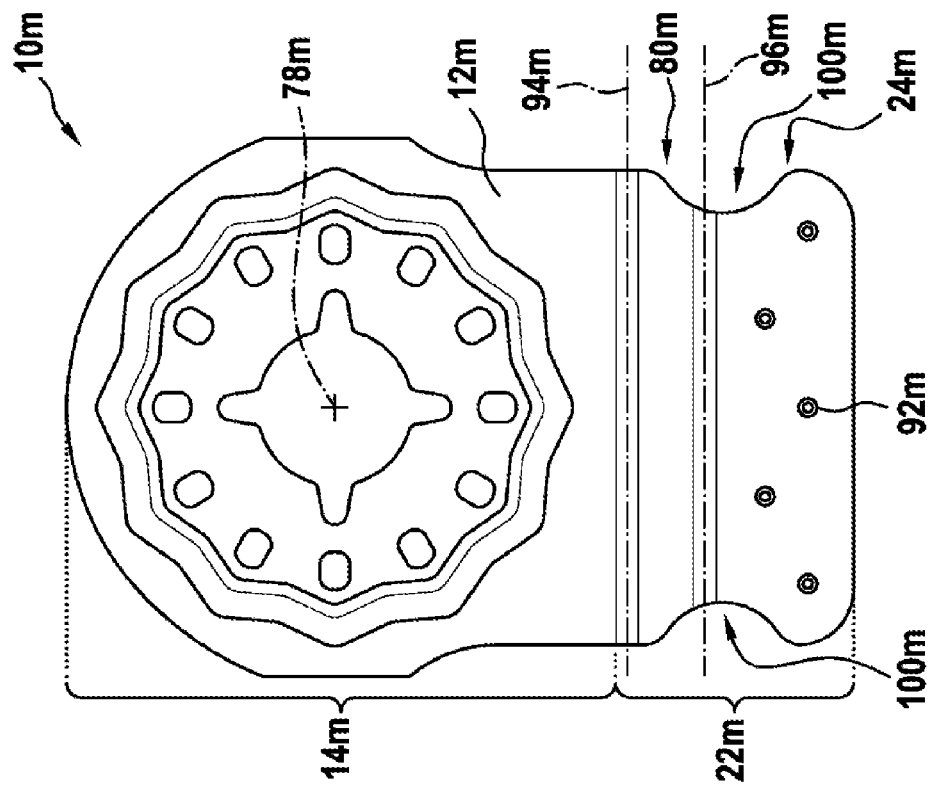
FIG. 15 shows a schematic plan view of a connecting part of a sawing tool according to the disclosure in a thirteenth exemplary embodiment.

FIG. 15 shows a sawing tool 10*m* in a thirteenth exemplary embodiment. The sawing tool 10*m* has a connecting part 12*m* which at least partially forms a connecting region 14*m* for connecting to a tool receptacle of a hand-held power tool, in particular a multifunctional tool that is driven in an oscillating manner. The sawing tool 10*m* has a drive axis 78*m* which is arranged in the connecting region 14*m*. The sawing tool 10*m* has a transition region 22*m*. A connection point 24*m* of the sawing tool 10*m* is arranged in the transition region 22*m*. The connecting part 12*m* has a cranked formation 80*m*. The cranked formation 80*m* has a first axis of curvature 94*m* and a second axis of curvature 96*m*, about which the connecting part 12*m* is cranked. The connecting part 12*m* has two indentations 100*m*. In contrast to the twelfth exemplary embodiment, a center of the indentations 100*m* is arranged substantially on the second axis of curvature 96*m*. The first axis of curvature 94*m* does not intersect the indentations 100*m*. The second axis of curvature 96*m* intersects the indentations 100*m*. The indentations 100*m* protrude into the connection point 24*m*.

Figure 16:
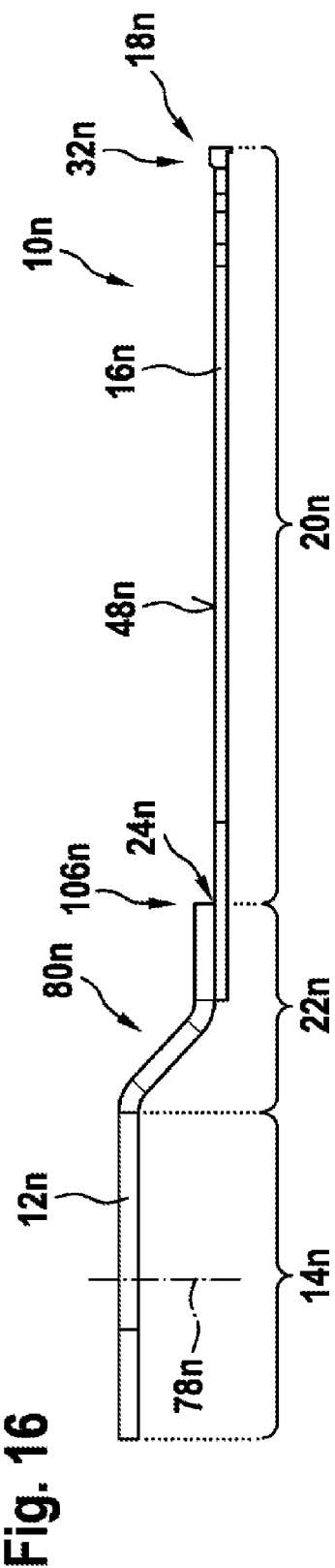
FIG. 16 shows a schematic side view of a sawing tool according to the disclosure in a fourteenth exemplary embodiment.
Figure 17:
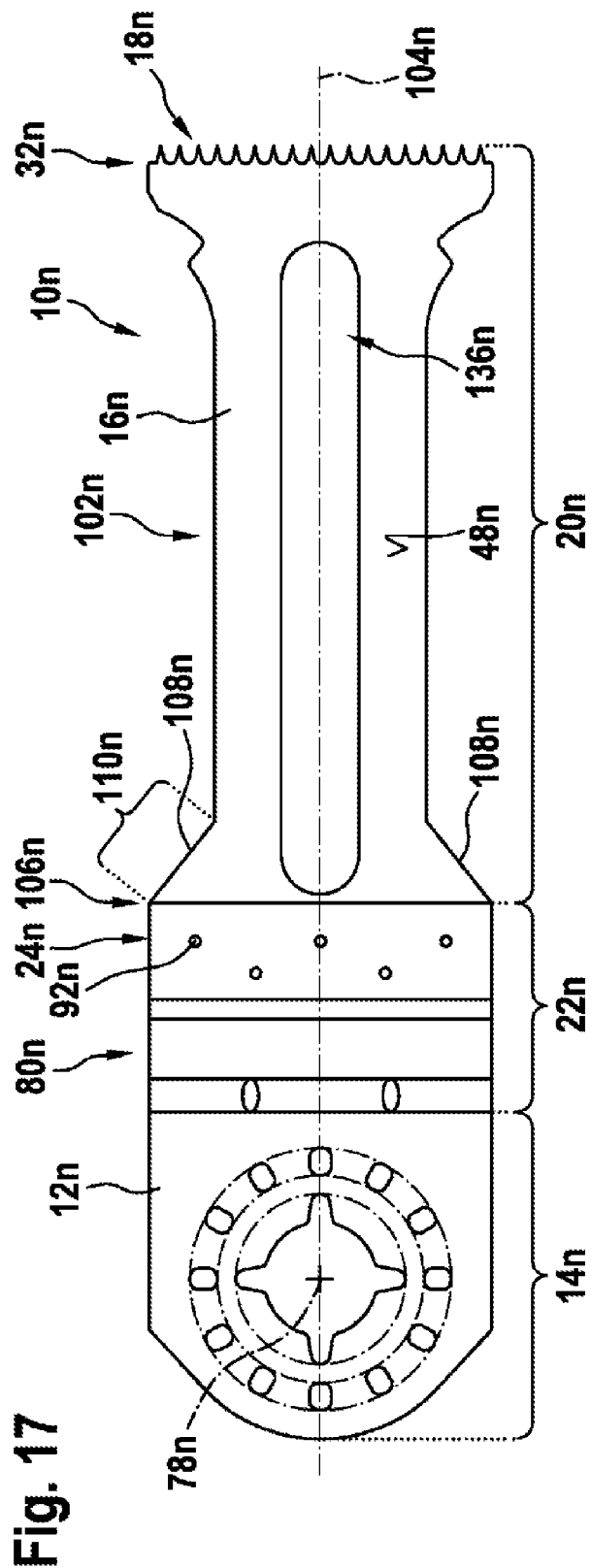
FIG. 17 shows a schematic plan view of the sawing tool according to the disclosure in the fourteenth exemplary embodiment.

FIGS. 16 and 17 show a sawing tool 10*n* in a fourteenth exemplary embodiment. The sawing tool 10*n* is configured as a saw blade. The sawing tool 10*n* is configured as a multifunctional-tool saw blade, in particular as what is known as an OMT saw blade (oscillation multi-tool saw blade). The sawing tool 10*n* has a connecting part 12*n* which at least partially forms a connecting region 14*n* for connecting to a tool receptacle of a hand-held power tool, in particular the multifunctional tool that is driven in an oscillating manner. In the present case, the connecting part 12*n* is configured as a form-fitting connecting part into which a tool receptacle of the hand-held power tool can be at least partially introduced. The sawing tool 10*n* has a drive axis 78*n* which is arranged in the connecting region 14*n*. The sawing tool 10*n* has a main body 16*n* which is connected to the connecting part 12*n*. In the present case, the main body 16*n* is of integral form. The main body 16*n* has a maximum thickness of preferably at most 1.2 mm, and particularly preferably at most 1.0 mm. The main body 16*n* has a minimum thickness of preferably at least 0.6 mm, and particularly preferably at least 0.8 mm. The main body 16*n* is at least partially formed from a hard metal (HM). In principle, the main body could also be formed from an HSS material. The connecting part 12*n* is arranged on a flank 48*n* of the main body 16*n*. The flank 48*n* extends orthogonally with respect to the drive axis 78*n* of the sawing tool 10*n*. The sawing tool 10*n* is of two-part configuration by means of the connecting part 12*n* and the main body 16*n*. The main body 16*n* is connected to the connecting part 12*n* in a materially bonded manner by means of a welded connection, which comprises a plurality of weld points 92*n*. The sawing tool 10*n* has a saw toothing 18*n* which is arranged on the main body 16*n*. The saw toothing 18*n* has a coating. The coating is at least partially formed from AlTiN. The coating formed from AlTiN is ideally applied to the main body 16*n* formed from hard metal. As a result, it is possible to achieve an advantageously high surface hardness, as a result of which it is advantageously possible to implement harder applications. In particular a tooth spacing of the saw toothing 18*n* and a degree of hard metal, in particular a cobalt content, are application-specific. The sawing tool 10*n* has a functional region 20*n* which is arranged on the main body 16*n*. The saw toothing 18*n* is arranged at an end 32*n* of the sawing tool 10*n* facing away from the connecting region 14*n*. The sawing tool 10*n* has a transition region 22*n*. The transition region 22*n* is partially arranged on the main body 16*n*. The transition region 22*n* is partially arranged on the connecting part 12*n*. The transition region 22*n* is arranged between the connecting region 14*n* and the functional region 20*n*. The main body 16*n* and the connecting part 12*n* are arranged so as to partially overlap in the transition region 22*n*. A connection point 24*n* of the sawing tool 10*n* is arranged in the transition region 22*n*. In the present case, the main body 16*n* is connected to the connecting part 12*n* at the connection point 24*n* in a materially bonded manner. The transition region 22*n* is of advantageously thick configuration at the connection point 24*n*, thus bringing about a higher stiffness. In the transition region 22*n*, the main body 16*n* is connected to the connecting part 12*n* in an areal manner. The connecting part 12*n* has a cranked formation 80*n*. The cranked formation 80*n* is arranged in the transition region 22*n*.

In contrast to the fourth exemplary embodiment in FIG. 6, at the cranked formation 80*n*, the connecting part 12*n* has the same maximum transverse extent, measured parallel to a cutting edge of the saw toothing 18*n*, as at a point of the connecting part 12*n* at which the transverse extent is measured orthogonal to the drive axis 78*n* and parallel to the cutting edge of the saw toothing 18*n*. Starting from the drive axis 78*n*, in the direction of the saw toothing 18*n*, the connecting part has a constant maximum transverse extent measured parallel to the cutting edge of the saw toothing 18*n*. The main body 16*n* has a tapering 102*n* in the functional region 20*n*. The tapering 102*n* is configured in a symmetrical manner with respect to a longitudinal axis 104*n* of the sawing tool 10*n*. The tapering 102*n* is preferably enlarged if there is a conflict with regard to moments of inertia. The tapering 102*n* runs in a cutting plane of the saw toothing 18*n*, starting from an end 106*n* of the connecting part 12*n* facing toward the saw toothing 18*n* in the direction of the saw toothing 18*n*. Directly from the end 106*n* of the connecting part 12*n* facing toward the saw toothing 18*n*, an outer contour 108*n* of the main body 16*n* runs, in a portion 110*n*, in the cutting plane of the saw toothing 18*n* in the direction of the saw toothing 18*n* at an angle of at most 45 degrees with respect to the longitudinal axis 104*n*. At ends of the portion 110*n*, the outer contour 108*n* of the main body 16*n* is free from rounded portions. The main body 16*n* has an aperture 136*n*. The aperture 136*n* is optional, in particular in the case of a conflict with regard to a limit of a moment of inertia. The aperture 136*n* is arranged in the functional region 20*n*. The aperture 136*n* is configured as a slot. The aperture 136*n* is arranged centrally in the main body 16*n*. A main extent axis of the aperture 136*n* is oriented coaxially with respect to the longitudinal axis of the sawing tool 10*n*. The aperture 136*n* extends over at least 75% of a maximum longitudinal extent of the main body 16*n*.

Figure 18:
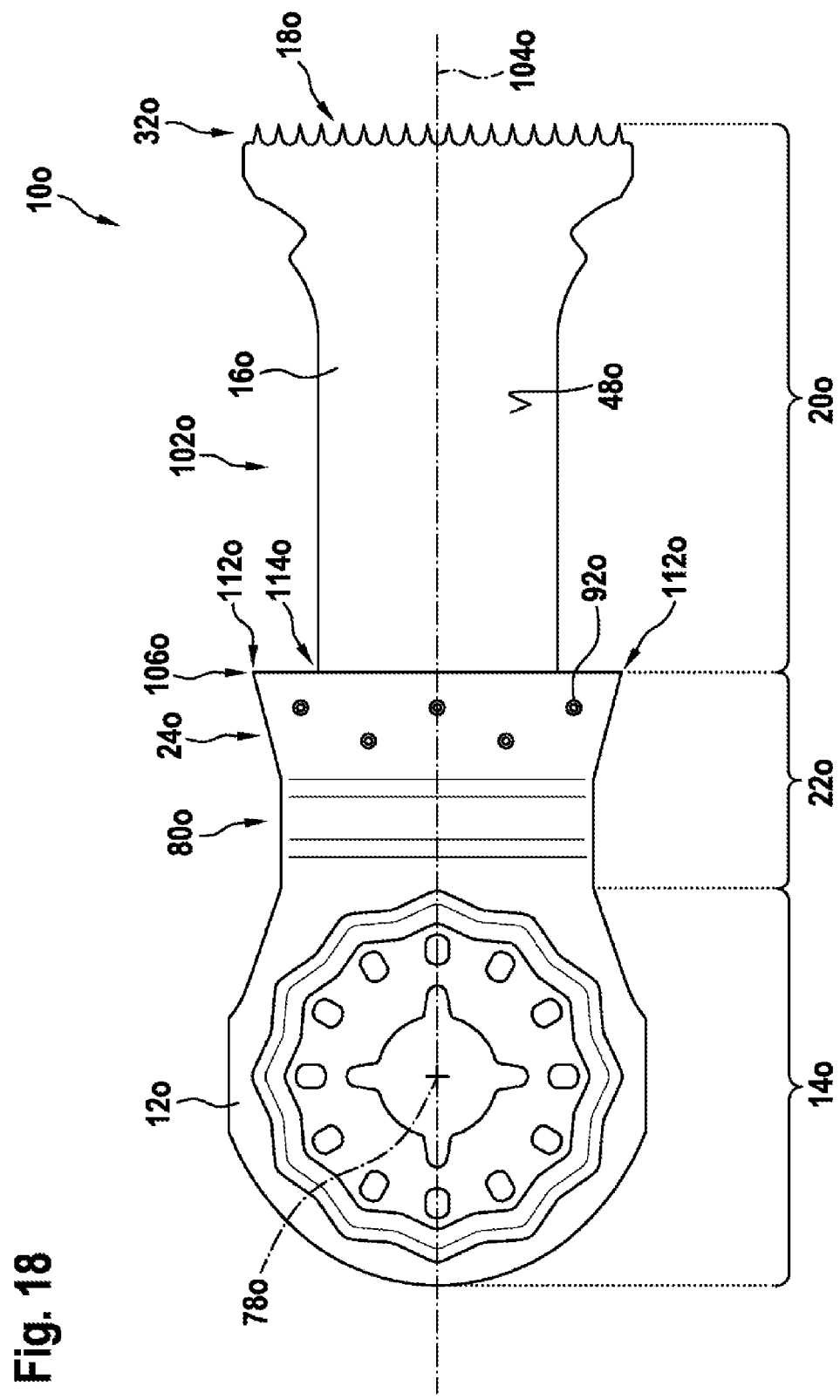
FIG. 18 shows a schematic plan view of a sawing tool according to the disclosure in a fifteenth exemplary embodiment.

FIG. 18 shows a sawing tool 10*o* in a fifteenth exemplary embodiment. The sawing tool 10*o* is configured in a similar manner to the sawing tool 10*n* from the fourteenth exemplary embodiment. The sawing tool 10*o* is configured as a saw blade. The sawing tool 10*o* is configured as a multifunctional-tool saw blade. The sawing tool 10*o* has a connecting part 12*o* which at least partially forms a connecting region 14*o* for connecting to a tool receptacle of a hand-held power tool. The sawing tool 10*o* has a drive axis 78*o* which is arranged in the connecting region 14*o*. The sawing tool 10*o* has a main body 16*o* which is connected to the connecting part 12*o*. In the present case, the main body 16*o* is of integral form. The connecting part 12*o* is arranged on a flank 48*o* of the main body 16*o*. The main body 16*o* is connected to the connecting part 12*o* in a materially bonded manner by means of a welded connection, which comprises a plurality of weld points 92*o*. The sawing tool 10*o* has a saw toothing 18*o* which is arranged on the main body 16*o*. The sawing tool 10*o* has a functional region 20*o* which is arranged on the main body 16*o*. The saw toothing 18*o* is arranged at an end 32*o* of the sawing tool 10*o* facing away from the connecting region 14*o*. The sawing tool 10*o* has a transition region 22*o*. A connection point 24*o* of the sawing tool 10*o* is arranged in the transition region 22*o*. The connecting part 12*o* has a cranked formation 80*o*. The cranked formation 80*o* is arranged in the transition region 22*o*. In the functional region 20*o*, the main body 16*o* has a tapering 102*o*. The tapering 102*o* is configured in a symmetrical manner with respect to a longitudinal axis 104*o* of the sawing tool 10*o*.

In contrast to the fourteenth exemplary embodiment in FIGS. 16 and 17, at the cranked formation 80*o* and in the transition region 22*o*, the connecting part 12*o* has a lower maximum transverse extent, measured parallel to a cutting edge of the saw toothing 18*o*, than at a point of the connecting part 12*o* at which the transverse extent is measured orthogonal to the drive axis 78*o* and parallel to the cutting edge of the saw toothing 18*0*. In a region between the drive axis 78*o* and an end 106*o* of the connecting part 12*o* facing toward the saw toothing 19*o*, the connecting part is laterally shaped in a substantially concave manner. The connecting part 12*o* has two protrusions 112*o* which are arranged in the transition region 22*o*. The protrusions 112*o* each form an acute angle. Between the transition region 22*o* and the functional region 20*o*, a shoulder 114*o* is formed on the sawing tool 10*o*. The protrusion 112*o* of the connecting part 12*o* and the tapering 102*o* of the main body 16*o* are arranged such that they form the shoulder 114*o*.

Figure 19:
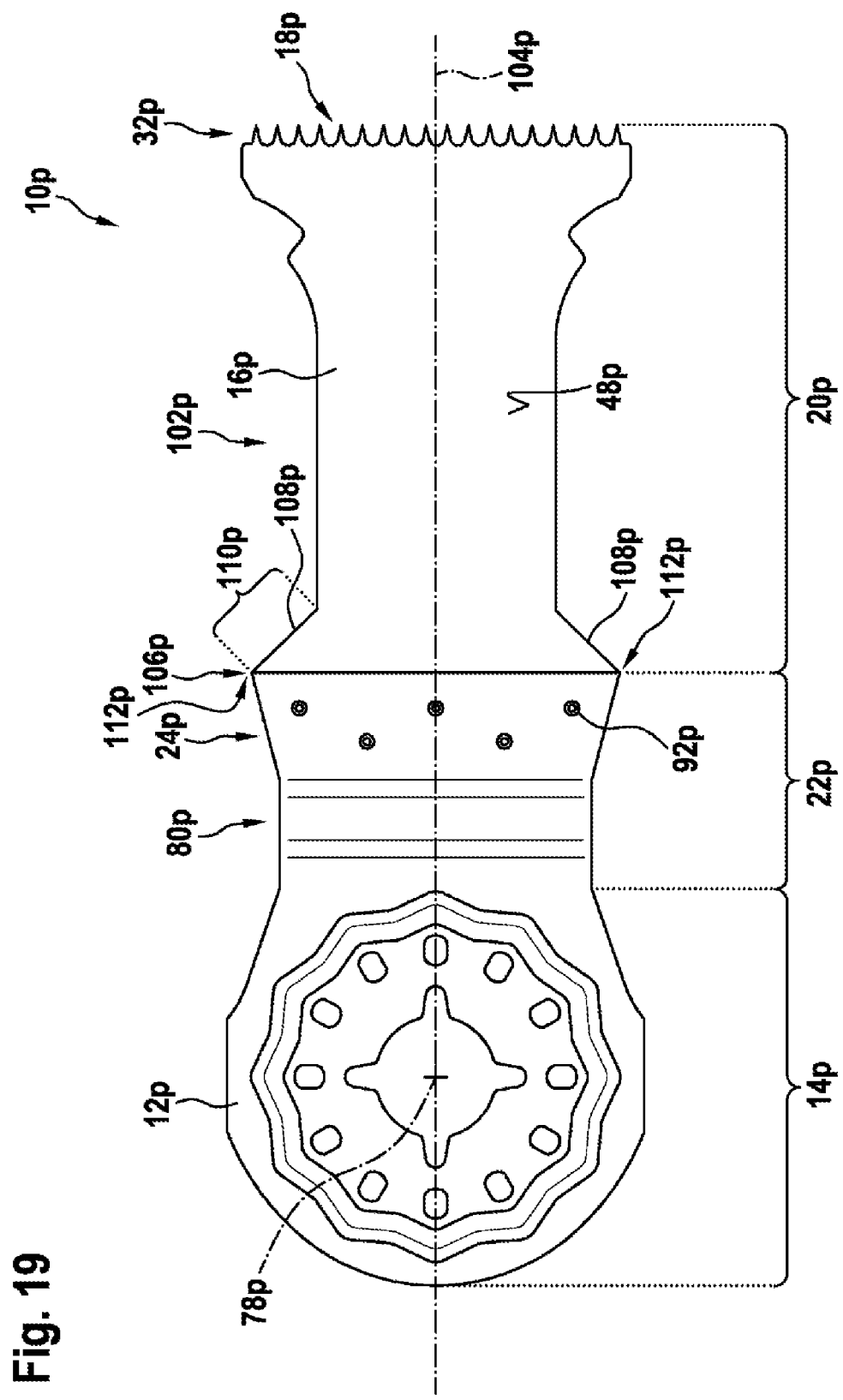
FIG. 19 shows a schematic plan view of a sawing tool according to the disclosure in a sixteenth exemplary embodiment.

FIG. 19 shows a sawing tool 10*p* in a sixteenth exemplary embodiment. The sawing tool 10*p* is configured in a similar manner to the sawing tool 10*o* from the fifteenth exemplary embodiment. The sawing tool 10*p* has a connecting part 12*p* which at least partially forms a connecting region 14*p* for connecting to a tool receptacle of a hand-held power tool. The sawing tool 10*p* has a drive axis 78*p* which is arranged in the connecting region 14*p*. The sawing tool 10*p* has a main body 16*p* which is connected to the connecting part 12*p*. The connecting part 12*p* is arranged on a flank 48*p* of the main body 16*p*. The main body 16*p* is connected to the connecting part 12*p* in a materially bonded manner by means of a welded connection, which comprises a plurality of weld points 92*p*. The sawing tool 10*p* has a saw toothing 18*p* which is arranged on the main body 16*p*. The sawing tool 10*p* has a functional region 20*p* which is arranged on the main body 16*p*. The saw toothing 18*p* is arranged at an end 32*p* of the sawing tool 10*p* facing away from the connecting region 14*p*. The sawing tool 10*p* has a transition region 22*p*. A connection point 24*p* of the sawing tool 10*p* is arranged in the transition region 22*p*. The connecting part 12*p* has a cranked formation 80*p*. In the functional region 20*p*, the main body 16*p* has a tapering 102*p*. The tapering 102*p* is configured in a symmetrical manner with respect to a longitudinal axis 104*p* of the sawing tool 10*p*. The connecting part 12*p* has two protrusions 112*p* which are arranged in the transition region 22*p*.

In contrast to the fifteenth exemplary embodiment in FIG. 18, at an end 106*p* of the connecting part 12*p* facing toward the saw toothing 18*p*, the main body 16*p* has the same maximum transverse extent, measured parallel to a cutting edge of the saw toothing 18*p*, as the connecting part 12*p* at the end 106*p* thereof. Directly from the end 106*p* of the connecting part 12*p* facing toward the saw toothing 18*p*, an outer contour 108*p* of the main body 16*p* runs, in a portion 110*p*, in a cutting plane of the saw toothing 18*p* in the direction of the saw toothing 18*p* at an angle of at most 45 degrees with respect to the longitudinal axis 104*p*. At ends of the portion 110*p*, the outer contour 108*p* of the main body 16*p* is free from rounded portions.

Figure 20:
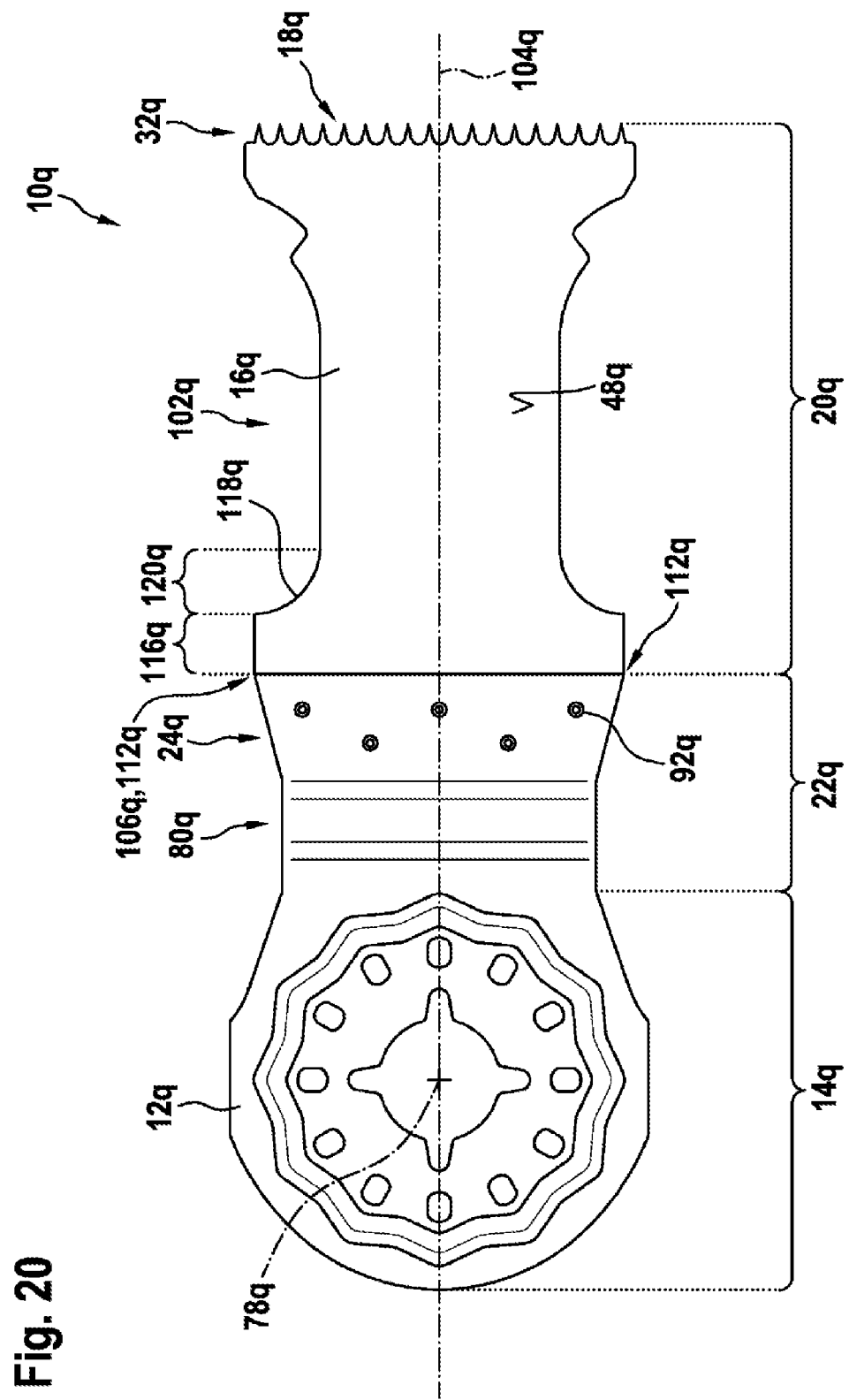
FIG. 20 shows a schematic plan view of a sawing tool according to the disclosure in a seventeenth exemplary embodiment.

FIG. 20 shows a sawing tool 10*q* in a seventeenth exemplary embodiment. The sawing tool 10*q* is configured in a similar manner to the sawing tool 10*o* from the fifteenth exemplary embodiment. The sawing tool 10*q* has a connecting part 12*q* which at least partially forms a connecting region 14*q* for connecting to a tool receptacle of a hand-held power tool. The sawing tool 10*q* has a drive axis 78*q* which is arranged in the connecting region 14*q*. The sawing tool 10*q* has a main body 16*q* which is connected to the connecting part 12*q*. The connecting part 12*q* is arranged on a flank 48*q* of the main body 16*q*. The main body 16*q* is connected to the connecting part 12*q* in a materially bonded manner by means of a welded connection, which comprises a plurality of weld points 92*q*. The sawing tool 10*q* has a saw toothing 18*q* which is arranged on the main body 16*q*. The sawing tool 10*q* has a functional region 20*q* which is arranged on the main body 16*q*. The saw toothing 18*q* is arranged at an end 32*q* of the sawing tool 10*q* facing away from the connecting region 14*q*. The sawing tool 10*q* has a transition region 22*q*. A connection point 24*q* of the sawing tool 10*q* is arranged in the transition region 22*q*. The connecting part 12*q* has a cranked formation 80*q*. In the functional region 20*q*, the main body 16*q* has a tapering 102*q*. The tapering 102*q* is configured in a symmetrical manner with respect to a longitudinal axis 104q of the sawing tool 10q. The connecting part 12q has two protrusions 112q which are arranged in the transition region 22q.

In contrast to the fifteenth exemplary embodiment in FIG. 18, at an end 106q of the connecting part 12q facing toward the saw toothing 18q, the main body 16q has the same maximum transverse extent, measured parallel to a cutting edge of the saw toothing 18q, as the connecting part 12q at the end 106q thereof. Directly from the end 106q of the connecting part 12q facing toward the saw toothing 18q, the main body 16q has, in a portion 116q, a constant maximum transverse extent measured parallel to the cutting edge of the saw toothing 18q. Directly following the portion 116q, in a further portion 120q, an outer contour 118q of the main body 16q runs in the shape of a quarter circle and in a concave manner in a cutting plane of the saw toothing 18q in the direction of the saw toothing 18q. Along the longitudinal axis 104q, a maximum longitudinal extent of the portion 116q is equal to a maximum longitudinal extent 120q of the further portion 120q.

Figure 21:
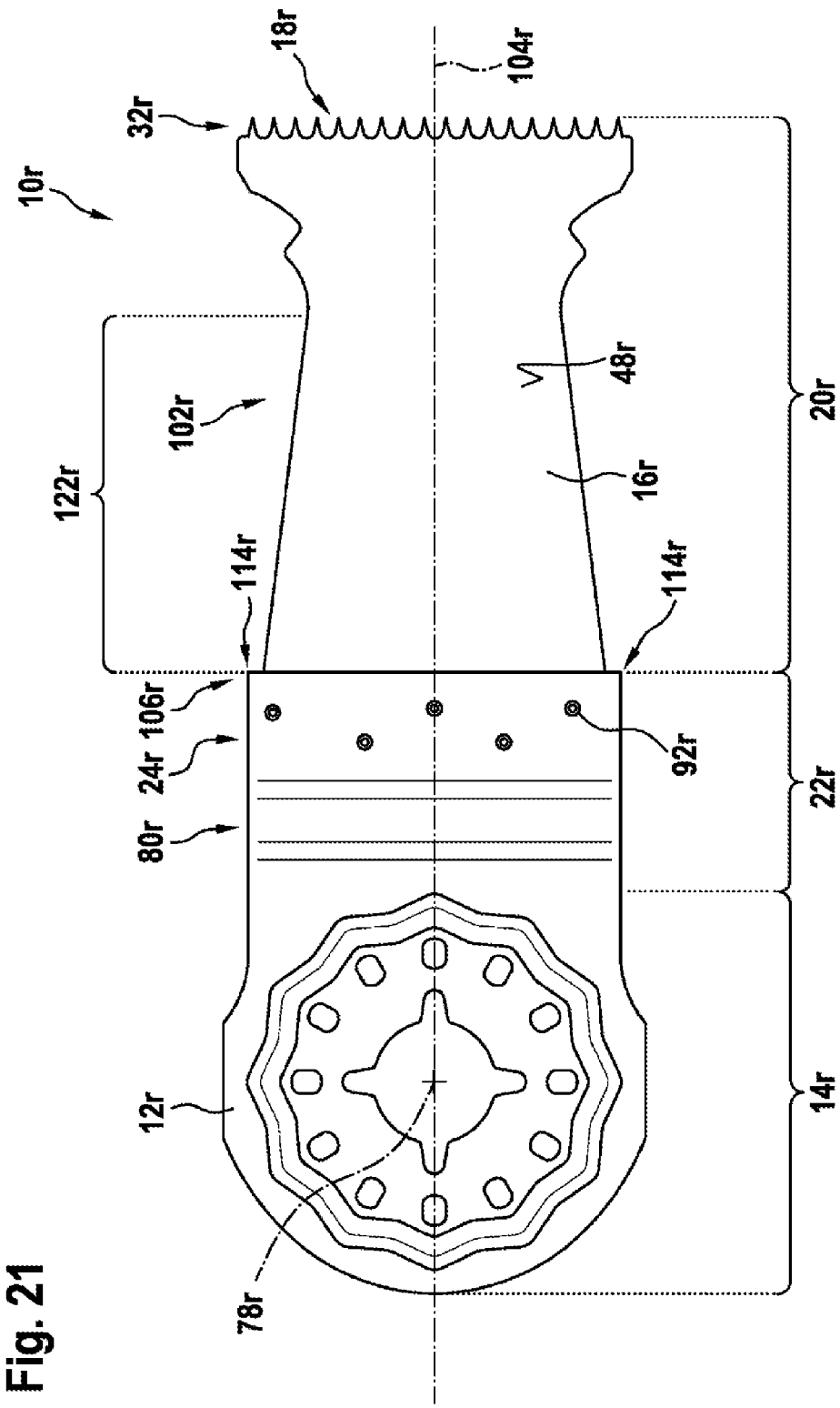
FIG. 21 shows a schematic plan view of a sawing tool according to the disclosure in an eighteenth exemplary embodiment.

FIG. 21 shows a sawing tool 10r in an eighteenth exemplary embodiment. The sawing tool 10r is configured in a similar manner to the sawing tool 10d from the fourth exemplary embodiment. The sawing tool 10r has a connecting part 12r which at least partially forms a connecting region 14r for connecting to a tool receptacle of a hand-held power tool. The connecting part 12r is configured in a substantially identical manner to the connecting part 12d from the fourth exemplary embodiment. The sawing tool 10r has a drive axis 78r which is arranged in the connecting region 14r. The sawing tool 10r has a main body 16r which is connected to the connecting part 12r. The connecting part 12r is arranged on a flank 48r of the main body 16r. The main body 16r is connected to the connecting part 12r in a materially bonded manner by means of a welded connection, which comprises a plurality of weld points 92r. The sawing tool 10r has a saw toothing 18r which is arranged on the main body 16r. The sawing tool 10r has a functional region 20r which is arranged on the main body 16r. The saw toothing 18r is arranged at an end 32r of the sawing tool 10r facing away from the connecting region 14r. The sawing tool 10r has a transition region 22r. A connection point 24r of the sawing tool 10r is arranged in the transition region 22r. The connecting part 12r has a cranked formation 80r. In the functional region 20r, the main body 16r has a tapering 102r. The tapering 102r is configured in a symmetrical manner with respect to a longitudinal axis 104r of the sawing tool 10r.

In contrast to the fourth exemplary embodiment in FIG. 6, at an end 106r of the connecting part 12r facing toward the saw toothing 18r, the main body 16r has a lower maximum transverse extent, measured parallel to a cutting edge of the saw toothing 18r, than the connecting part 12r at the end 106r thereof. In the functional region 20r, along the longitudinal axis 104r, the main body 16r has a non-constant maximum transverse extent measured parallel to a cutting edge of the saw toothing 18r. Between the transition region 22r and the functional region 20r, a shoulder 114r is formed on the sawing tool 10r. The connecting part 12r and the main body 16r are arranged relative to one another such that they form the shoulder 114r. Directly from the end 106r of the connecting part 12r facing toward the saw toothing 18r, the main body 16r has, in a portion 122r, a maximum transverse extent which decreases linearly in the direction of the saw toothing 18r and which is measured parallel to the cutting edge of the saw toothing 18r. In the present case, a maximum longitudinal extent of the portion 122r is at least 50% of a maximum longitudinal extent of the main body 16r.

Figure 22:
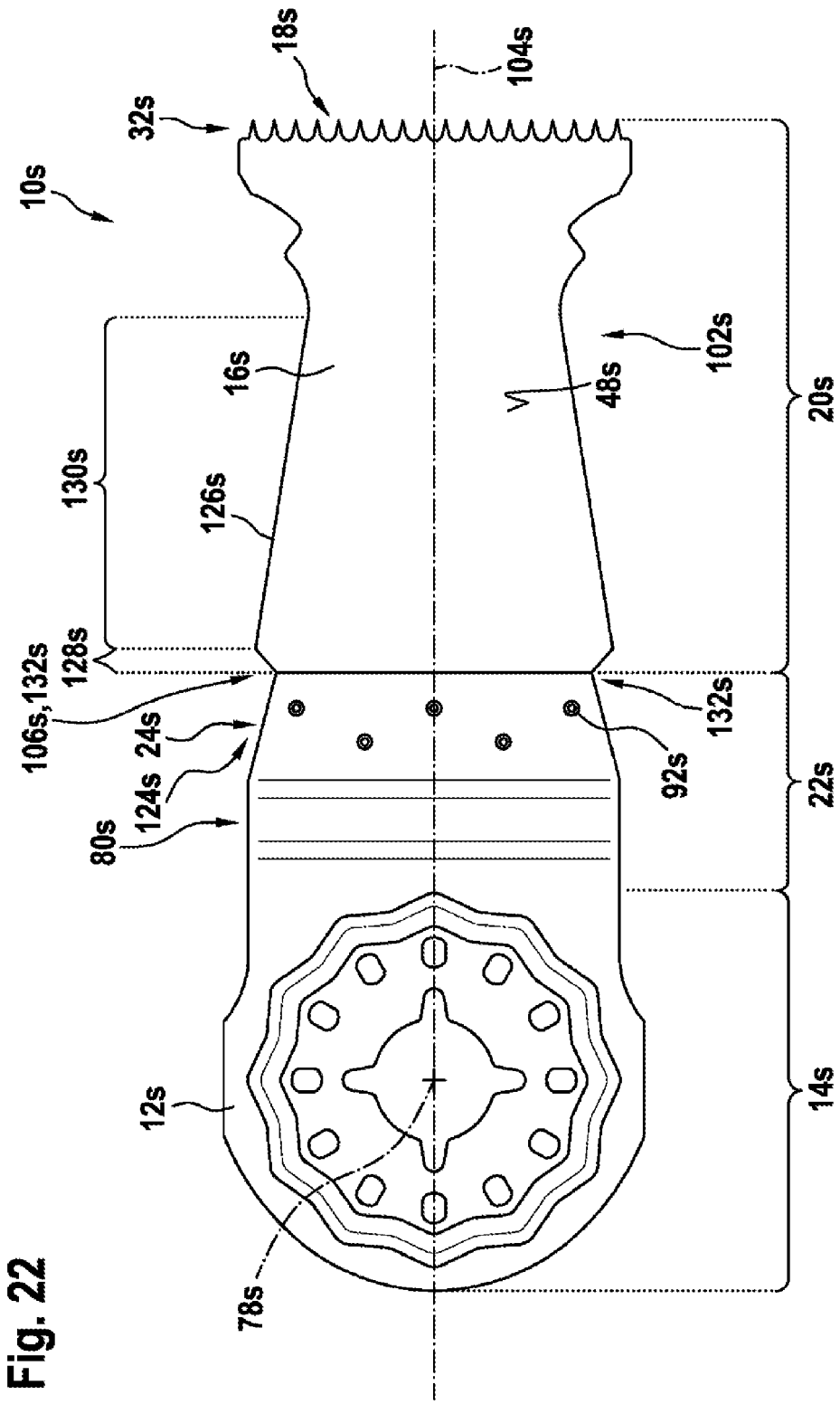
FIG. 22 shows a schematic plan view of a sawing tool according to the disclosure in a nineteenth exemplary embodiment.

FIG. 22 shows a sawing tool 10s in a nineteenth exemplary embodiment. The sawing tool 10s is configured in a similar manner to the sawing tool 10r from the eighteenth exemplary embodiment. The sawing tool 10s has a connecting part 12s which at least partially forms a connecting region 14s for connecting to a tool receptacle of a hand-held power tool. The sawing tool 10s has a drive axis 78s which is arranged in the connecting region 14s. The sawing tool 10s has a main body 16s which is connected to the connecting part 12s. The connecting part 12s is arranged on a flank 48s of the main body 16s. The main body 16s is connected to the connecting part 12s in a materially bonded manner by means of a welded connection, which comprises a plurality of weld points 92s. The sawing tool 10s has a saw toothing 18s which is arranged on the main body 16s. The sawing tool 10s has a functional region 20s which is arranged on the main body 16s. The saw toothing 18s is arranged at an end 32s of the sawing tool 10s facing away from the connecting region 14s. The sawing tool 10s has a transition region 22s. A connection point 24s of the sawing tool 10s is arranged in the transition region 22s. The connecting part 12s has a cranked formation 80s. In the functional region 20s, the main body 16s has a tapering 102s. The tapering 102s is configured in a symmetrical manner with respect to a longitudinal axis 104s of the sawing tool 10s.

In contrast to the eighteenth exemplary embodiment in FIG. 21, the connecting part 12s has a tapering 124s at the connection point 24s. The tapering 124s extends along the longitudinal axis 104s in the direction of the saw toothing 18s. At an end 106s of the connecting part 12s facing toward the saw toothing 18s, the main body 16s has the same maximum transverse extent, measured parallel to a cutting edge of the saw toothing 18s, as the connecting part 12s at the end 106s thereof. Directly from the end 106s of the connecting part 12s facing toward the saw toothing 18s, an outer contour 126s of the main body 16s runs, in a portion 128s, in a cutting plane of the saw toothing 18s in the direction of the saw toothing 18s at an angle of at most 45 degrees with respect to the longitudinal axis 104s, wherein, in the portion 128s, the maximum transverse extent of the main body 16s increases linearly in the direction of the saw toothing 18s. At ends of the portion 128s, the outer contour 126s of the main body 16s is free from rounded portions. Directly following the portion 128s in the direction of the saw toothing 18s, the main body 16s has, in a further portion 130s, a maximum transverse extent which decreases linearly in the direction of the saw toothing 18s and which is measured parallel to the cutting edge of the saw toothing 18s. In the present case, a maximum longitudinal extent of the further portion 130s is at least 50% of a maximum longitudinal extent of the main body 16s. Between the transition region 22s and the functional region 20s, two lateral indentations 132s are formed on the sawing tool 10s.

Figure 23:
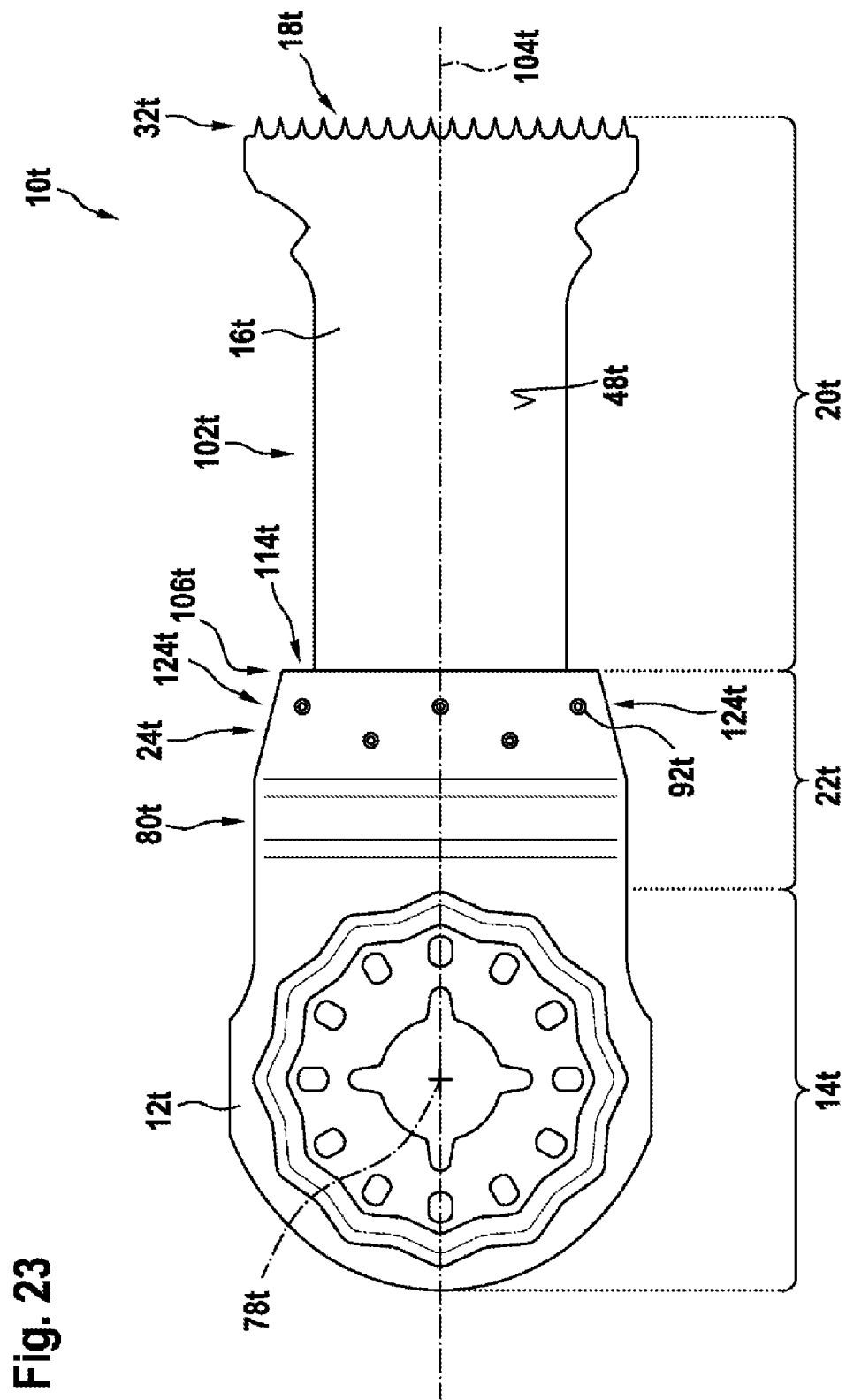
FIG. 23 shows a schematic plan view of a sawing tool according to the disclosure in a twentieth exemplary embodiment.

FIG. 23 shows a sawing tool 10t in a twentieth exemplary embodiment. The sawing tool 10t is configured in a similar manner to the sawing tool 10s from the nineteenth exemplary embodiment. The sawing tool 10t has a connecting part 12t which at least partially forms a connecting region 14t for connecting to a tool receptacle of a hand-held power tool. The sawing tool 10t has a drive axis 78t which is arranged in the connecting region 14t. The sawing tool 10t has a main body 16t which is connected to the connecting part 12t. The connecting part 12t is arranged on a flank 48t of the main body 16t. The main body 16t is connected to the connecting part 12*t* in a materially bonded manner by means of a welded connection, which comprises a plurality of weld points 92*t*. The sawing tool 10*t* has a saw toothing 18*t* which is arranged on the main body 16*t*. The sawing tool 10*t* has a functional region 20*t* which is arranged on the main body 16*t*. The saw toothing 18*t* is arranged at an end 32*t* of the sawing tool 10*t* facing away from the connecting region 14*t*. The sawing tool 10*t* has a transition region 22*t*. A connection point 24*t* of the sawing tool 10*t* is arranged in the transition region 22*t*. The connecting part 12*t* has a tapering 124*t* at the connection point 24*t*. The connecting part 12*t* has a cranked formation 80*t*. In the functional region 20*t*, the main body 16*t* has a tapering 102*t*. The tapering 102*t* is configured in a symmetrical manner with respect to a longitudinal axis 104*t* of the sawing tool 10*t*.

In contrast to the nineteenth exemplary embodiment in FIG. 22, at an end 106*t* of the connecting part 12*t* facing toward the saw toothing 18*t*, the main body 16*t* has a lower maximum transverse extent, measured parallel to a cutting edge of the saw toothing 18*t*, than the connecting part 12*t* at the end 106*t* thereof. Between the transition region 22*t* and the functional region 20*t*, a shoulder 114*t* is formed on the sawing tool 10*t*. The connecting part 12*t* and the main body 16*t* are arranged relative to one another such that they form the shoulder 114*t*. In the functional region 20*t*, the main body 16*t* has a constant maximum transverse extent over a maximum longitudinal extent of at least 50% of a maximum longitudinal extent of the main body 16*t*. Directly following the end 106*t* facing toward the saw toothing 18*t*, in the direction of the saw toothing 18*t*, the main body 16*t* has the constant maximum transverse extent measured parallel to the cutting edge of the saw toothing 18*t*.

Figure 24:
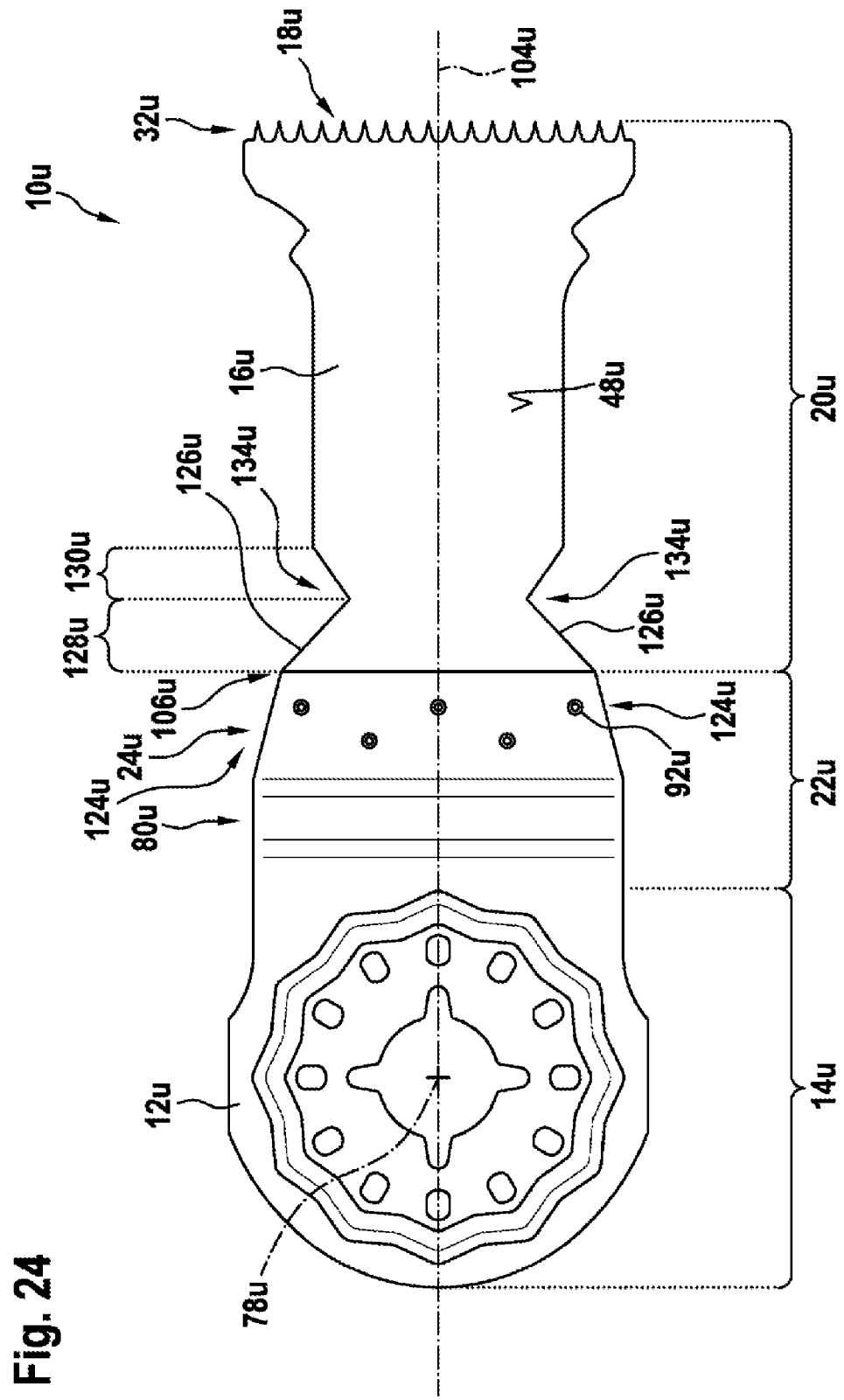
FIG. 24 shows a schematic plan view of a sawing tool according to the disclosure in a twenty-first exemplary embodiment.

FIG. 24 shows a sawing tool 10*u* in a twenty-first exemplary embodiment. The sawing tool 10*u* is configured in a similar manner to the sawing tool 10*s* from the nineteenth exemplary embodiment. The sawing tool 10*u* has a connecting part 12*u* which at least partially forms a connecting region 14*u* for connecting to a tool receptacle of a hand-held power tool. The sawing tool 10*u* has a drive axis 78*u* which is arranged in the connecting region 14*u*. The sawing tool 10*u* has a main body 16*u* which is connected to the connecting part 12*u*. The connecting part 12*u* is arranged on a flank 48*u* of the main body 16*u*. The main body 16*u* is connected to the connecting part 12*u* in a materially bonded manner by means of a welded connection, which comprises a plurality of weld points 92*u*. The sawing tool 10*u* has a saw toothing 18*u* which is arranged on the main body 16*u*. The sawing tool 10*u* has a functional region 20*u* which is arranged on the main body 16*u*. The saw toothing 18*u* is arranged at an end 32*u* of the sawing tool 10*u* facing away from the connecting region 14*u*. The sawing tool 10*u* has a transition region 22*u*. A connection point 24*u* of the sawing tool 10*u* is arranged in the transition region 22*u*. The connecting part 12*u* has a tapering 124*u* at the connection point 24*u*. The connecting part 12*u* has a cranked formation 80*u*.

In contrast to the nineteenth exemplary embodiment in FIG. 22, directly from an end 106*u* of the connecting part 12*u* facing toward the saw toothing 18*u*, an outer contour 126*u* of the main body 16*u* runs, in a portion 128*u*, in a cutting plane of the saw toothing 18*u* in the direction of the saw toothing 18*u* at an angle of at most 45 degrees with respect to the longitudinal axis 104*u*, wherein, in the portion 128*u*, a maximum transverse extent of the main body 16*u* decreases linearly in the direction of the saw toothing 18*u*. At ends of the portion 128*u*, the outer contour 126*u* of the main body 16*u* is free from rounded portions. Directly following the portion 128*u* in the direction of the saw toothing 18*u*, the main body 16*u* has, in a further portion 130*u*, a maximum transverse extent which increases linearly in the direction of the saw toothing 18*u* and which is measured parallel to the cutting edge of the saw toothing 18*u*. At ends of the further portion 130*u*, the outer contour 126*u* of the main body 16*u* is free from rounded portions. In the further portion 130*u*, the outer contour 126*u* of the main body 16*u* runs in a cutting plane of the saw toothing 18*u* in the direction of the saw toothing 18*u* at an angle of at most degrees away from the longitudinal axis 104*u*. A maximum longitudinal extent of the portion 128*u* is greater than a maximum longitudinal extent of the further portion 130*u*. In the functional region 20*u*, two lateral indentations 134*u* are formed on the main body 16*u*. The indentations 134*u* are configured in the form of a tapering of the main body 16*u*.

The invention claimed is:

1. A saw blade, comprising:
   at least one connecting part which at least partially forms a connecting region configured to connect to a tool receptacle of a hand-held power tool;
   at least one main body which is formed integrally with the at least one connecting part;
   at least one set saw toothing which is arranged on a bottom side of the at least one main body; and
   at least one functional region which is arranged on the at least one main body in the form of a reduction groove region on which the at least one set saw toothing is at least partially arranged, the reduction groove region including at least one reduction groove, a first reduction groove of the at least one reduction groove located directly above a first gullet, wherein
   at least one transition region is arranged between the connecting region and the at least one functional region,
   the at least one transition region has, compared with the at least one functional region, an increased bending stiffness in a direction orthogonal and/or parallel to a cutting plane of the at least one set saw toothing, and
   a depth of the first gullet is equal to a depth of a second gullet which is not directly beneath any of the at least one reduction groove.

2. The saw blade as claimed in claim 1, wherein a maximum thickness of the at least one main body in the at least one transition region corresponds at most to a maximum thickness of the at least one connecting part.

3. The saw blade as claimed in claim 1, wherein a ratio of a maximum longitudinal extent of the at least one transition region to a maximum longitudinal extent of the at least one functional region is less than 1.

4. The saw blade as claimed in claim 1, wherein:
   a maximum longitudinal extent of the at least one transition region corresponds to at most 50% of a maximum longitudinal extent of a cutting region of the at least one main body; and
   the at least one transition region is at least partially arranged in the cutting region.

5. The saw blade as claimed in claim 1, wherein a maximum longitudinal extent of the at least one transition region is less than 38.5 mm.

6. The saw blade as claimed in claim 1, wherein:
   at an end of the at least one main body facing away from the at least one set saw toothing, the at least one main body has a thickness, due to removal of material, which corresponds at most to a maximum thickness of the at least one main body in the at least one transition region; and the thickness at the end of the at least one main body decreases toward an end of the at least one main body facing away from the connecting region.

7. The saw blade as claimed in claim 1, further comprising:
at least one elevation generated by removal of material on the at least one main body in the at least one functional region which runs parallel to a cutting edge of the at least one set saw toothing, wherein
a first width of the at least one main body extending through the at least one elevation is greater than a second width of the at least one main body adjacent the at least one elevation.

8. The saw blade as claimed in claim 1, wherein, at an end of the at least one transition region facing away from the at least one set saw toothing, the at least one transition region has a maximum thickness, due to removal of material, which is smaller than a maximum thickness of the at least one transition region at an end of the at least one transition region facing toward the at least one set saw toothing.

9. The saw blade as claimed in claim 1, wherein the at least one main body is formed from an alloy, which comprises at least heat-treatable steel and nickel.

10. A method for producing a sawing tool, comprising:
forming at least one main body integrally with at least one connecting region;
forming at least one set saw toothing on a bottom side of the at least one main body;
forming at least one functional region on the at least one main body by removal of material to form a reduction groove region including at least one reduction groove, a first reduction groove of the at least one reduction groove located directly above a first gullet; and
forming at least one transition region between the at least one connecting region and the at least one functional region, wherein
the at least one set saw toothing is arranged at least partially on the at least one functional region,
the at least one transition region has, compared with the at least one functional region, an increased bending stiffness in a direction orthogonal and/or parallel to a cutting plane of the at least one set saw toothing, and
a depth of the first gullet is equal to a depth of a second gullet which is not directly beneath any of the at least one reduction groove.

11. The saw blade as claimed in claim 1, wherein:
the at least one transition region extends from a first end of the at least one main body facing away from the at least one set saw toothing to a second end of the at least one main body opposite the first end; and
there is no toothing included in the at least one transition region.

12. The saw blade as claimed in claim 11, wherein:
the at least one transition region has a first length from the first end of the at least one main body facing away from the at least one set saw toothing to the second end of the at least one main body opposite the first end at a first location;
the at least one transition region has a second length from the first end of the at least one main body facing away from the at least one set saw toothing to the second end of the at least one main body opposite the first end at a second location;
the first length is greater than the second length; and
the second location is between the at least one functional region and the first location.

* * * * *